(12) United States Patent
Kobayashi et al.

(10) Patent No.: US 11,923,492 B2
(45) Date of Patent: Mar. 5, 2024

(54) APPARATUS FOR MANUFACTURING BAGGED ELECTRODE, ACCUMULATING APPARATUS, AND METHOD FOR MANUFACTURING BAGGED ELECTRODE

(71) Applicant: KABUSHIKI KAISHA TOSHIBA, Minato-ku (JP)

(72) Inventors: Yuko Kobayashi, Kawasaki Kanagawa (JP); Misato Ishikawa, Kawasaki Kanagawa (JP); Shunsuke Hattori, Kawasaki Kanagawa (JP); Takamitsu Sunaoshi, Yokohama Kanagawa (JP); Takahiro Kokubo, Hiratsuka Kanagawa (JP)

(73) Assignee: Kabushiki Kaisha Toshiba, Toyko (JP)

( * ) Notice: Subject to any disclaimer, the term of this patent is extended or adjusted under 35 U.S.C. 154(b) by 577 days.

(21) Appl. No.: 16/802,801

(22) Filed: Feb. 27, 2020

(65) Prior Publication Data
US 2021/0083313 A1    Mar. 18, 2021

(30) Foreign Application Priority Data

Sep. 17, 2019 (JP) .................................. 2019-168605

(51) Int. Cl.
*H01M 50/463* (2021.01)
*B29C 65/00* (2006.01)
(Continued)

(52) U.S. Cl.
CPC ..... *H01M 10/0404* (2013.01); *B29C 65/2076* (2013.01); *B29C 66/433* (2013.01);
(Continued)

(58) Field of Classification Search
CPC ....... H01M 10/0404; H01M 10/10585; H01M 50/463
See application file for complete search history.

(56) References Cited

U.S. PATENT DOCUMENTS 4,407,063 A * 10/1983 Johnson ................ H01M 10/14
29/730
9,425,478 B2 8/2016 Yuhara et al.
(Continued)

FOREIGN PATENT DOCUMENTS

JP  2007-242506 A  9/2007
JP  2012-227125 A  11/2012
(Continued)

*Primary Examiner* — Jane J Rhee
(74) *Attorney, Agent, or Firm* — Finnegan, Henderson, Farabow, Garrett & Dunner, LLP

(57) ABSTRACT

An apparatus for manufacturing a bagged electrode includes a conveying unit, a first bonding unit, a second bonding unit, and a separating unit. The conveying unit conveys an electrode in a manner interposed between a pair of long separator materials unwound from a pair of rolls. The first bonding unit bonds the pair of long separator materials outside the electrode along a conveyance direction without stopping conveyance of the electrode and the pair of long separator materials. The second bonding unit bonds the pair of long separator materials outside the electrode along a direction intersecting the conveyance direction without stopping conveyance of the electrode and the pair of long separator materials. The separating unit cuts the pair of long separator materials along the direction intersecting the conveyance direction to cut off the bagged electrode without stopping conveyance of the electrode and the pair of long separator materials.

14 Claims, 35 Drawing Sheets

(51) Int. Cl.
  *B29C 65/20*   (2006.01)
  *H01M 10/04*   (2006.01)
  *H01M 10/0585* (2010.01)
  *B29L 31/34*   (2006.01)

(52) U.S. Cl.
  CPC ... *B29C 66/83511* (2013.01); *H01M 10/0585* (2013.01); *H01M 50/463* (2021.01); *B29L 2031/3468* (2013.01)

(56) References Cited

U.S. PATENT DOCUMENTS

| | | | |
|---|---|---|---|
| 9,780,401 B2 | 10/2017 | Yuhara et al. | |
| 2002/0020055 A1* | 2/2002 | Schwetz | H01M 50/463 |
| | | | 29/730 |
| 2006/0254209 A1* | 11/2006 | Hopwood | H01M 10/0404 |
| | | | 53/64 |
| 2014/0026400 A1 | 1/2014 | Yuhara et al. | |
| 2017/0252863 A1* | 9/2017 | Hwang | B23K 26/402 |

FOREIGN PATENT DOCUMENTS

| | | | |
|---|---|---|---|
| JP | 5666805 B2 | 2/2015 |
| JP | 5820138 B2 | 11/2015 |
| JP | 5901135 B2 | 4/2016 |
| JP | 2017-105083 A | 6/2017 |
| JP | 2017-117591 A | 6/2017 |
| JP | 6599211 B2 | 10/2019 |

\* cited by examiner

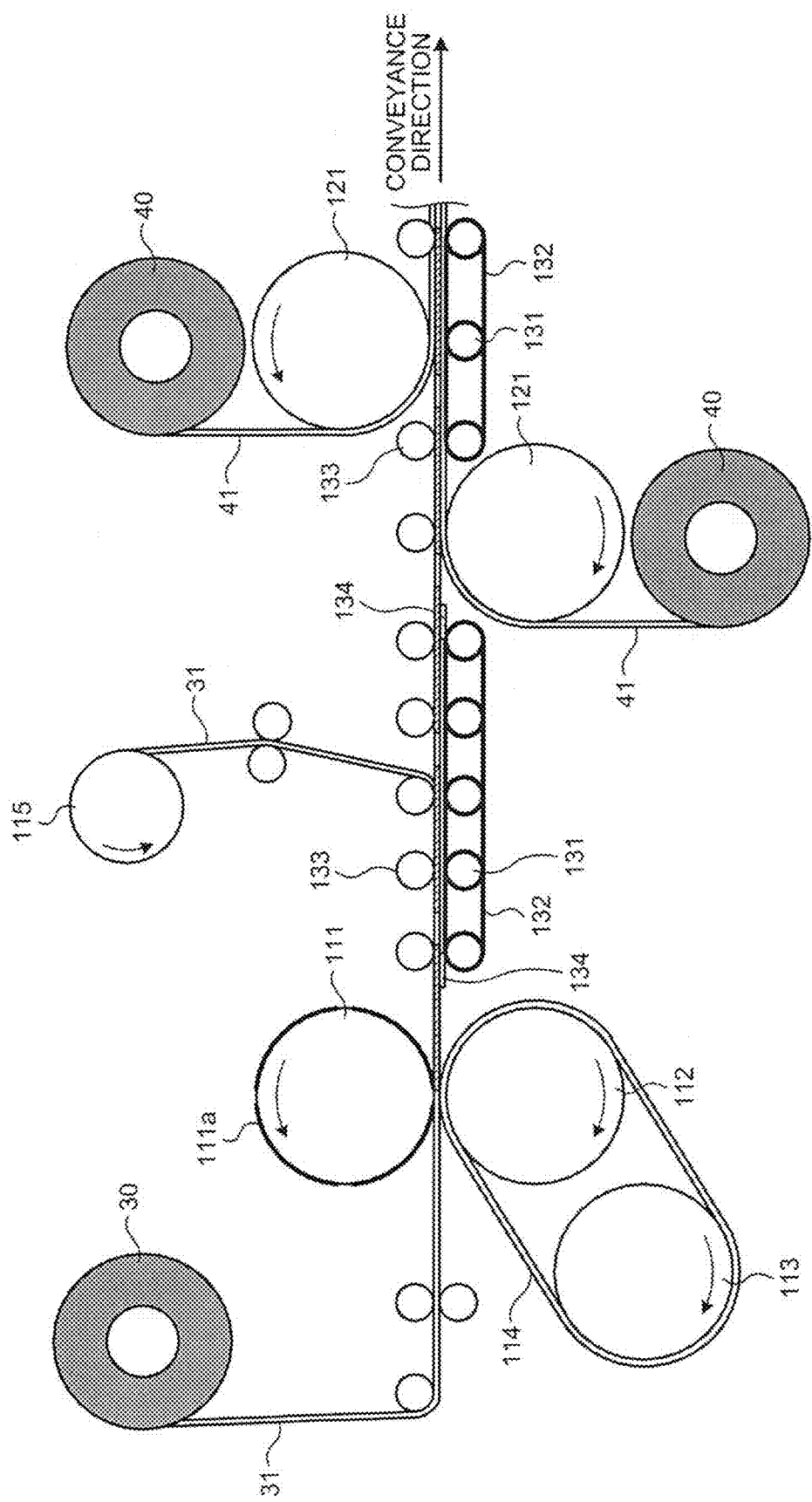

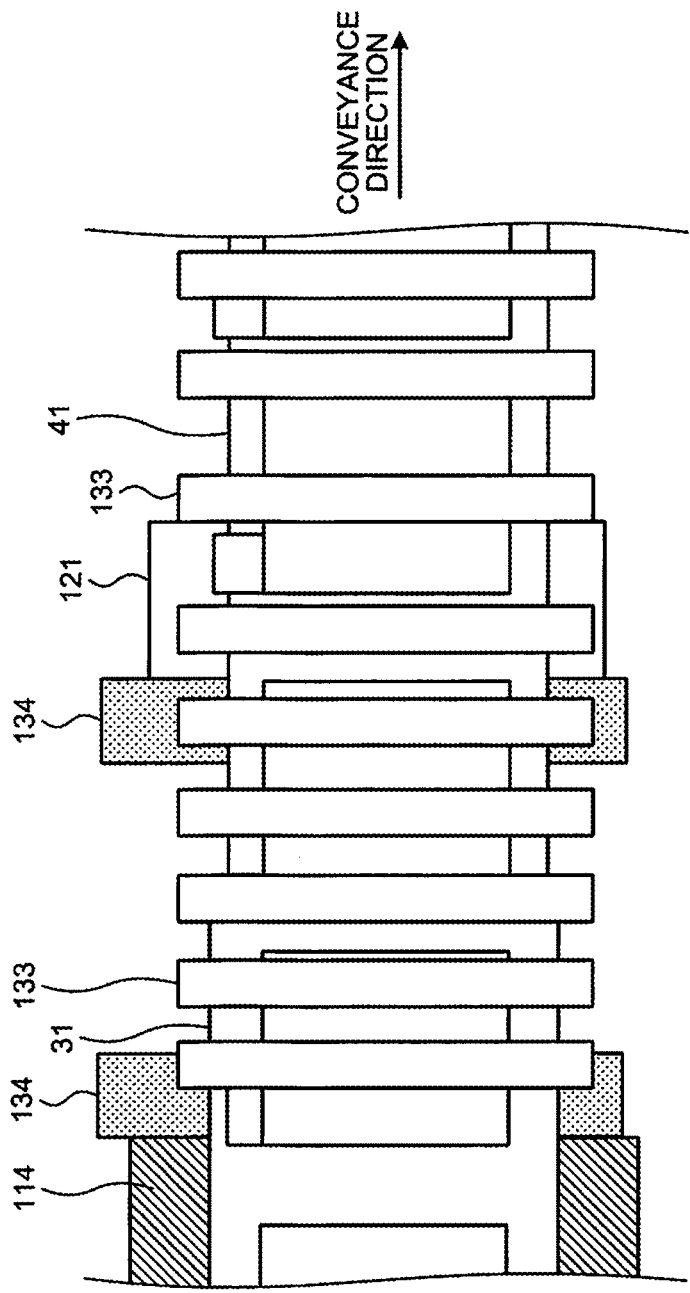

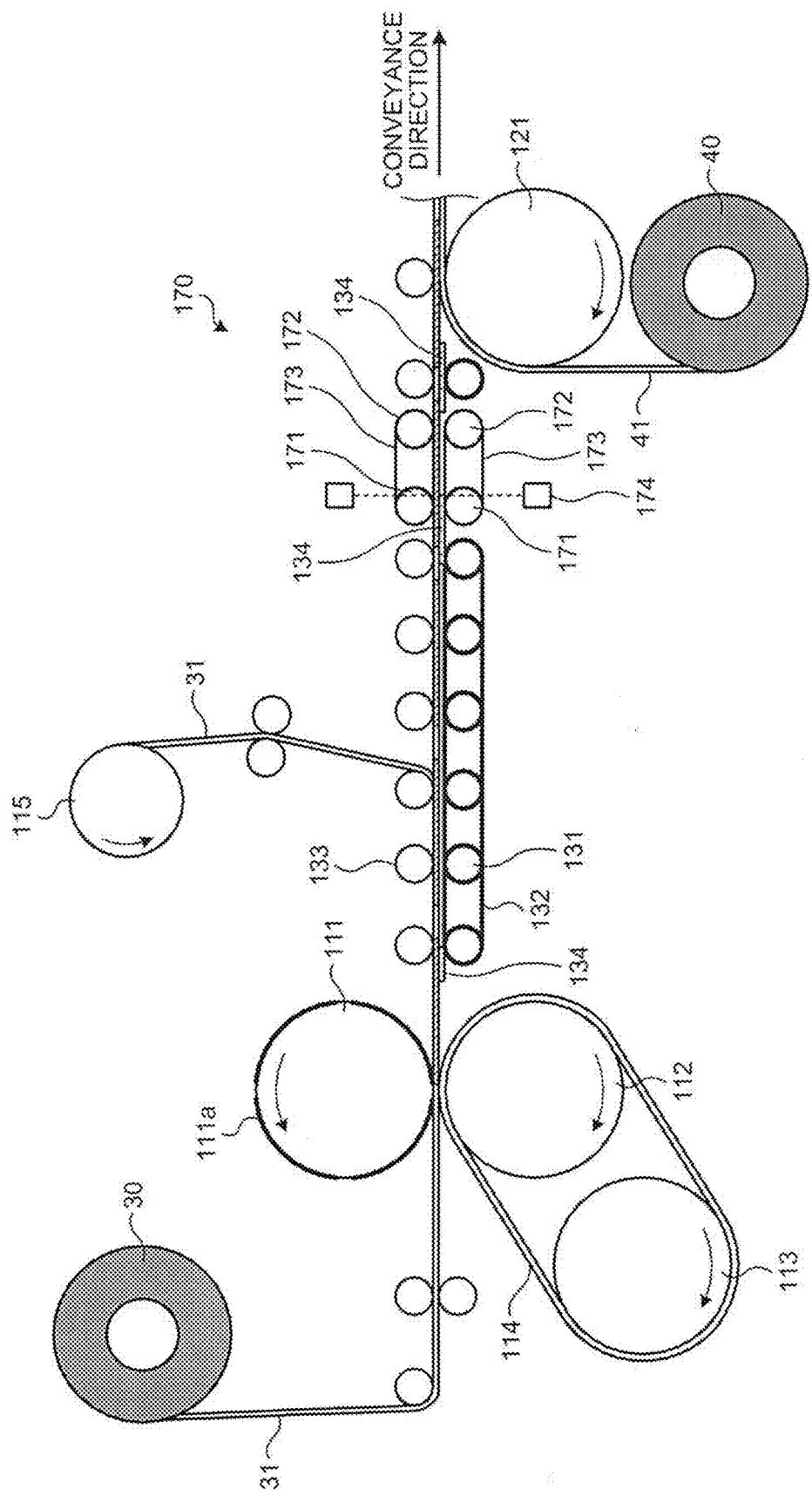

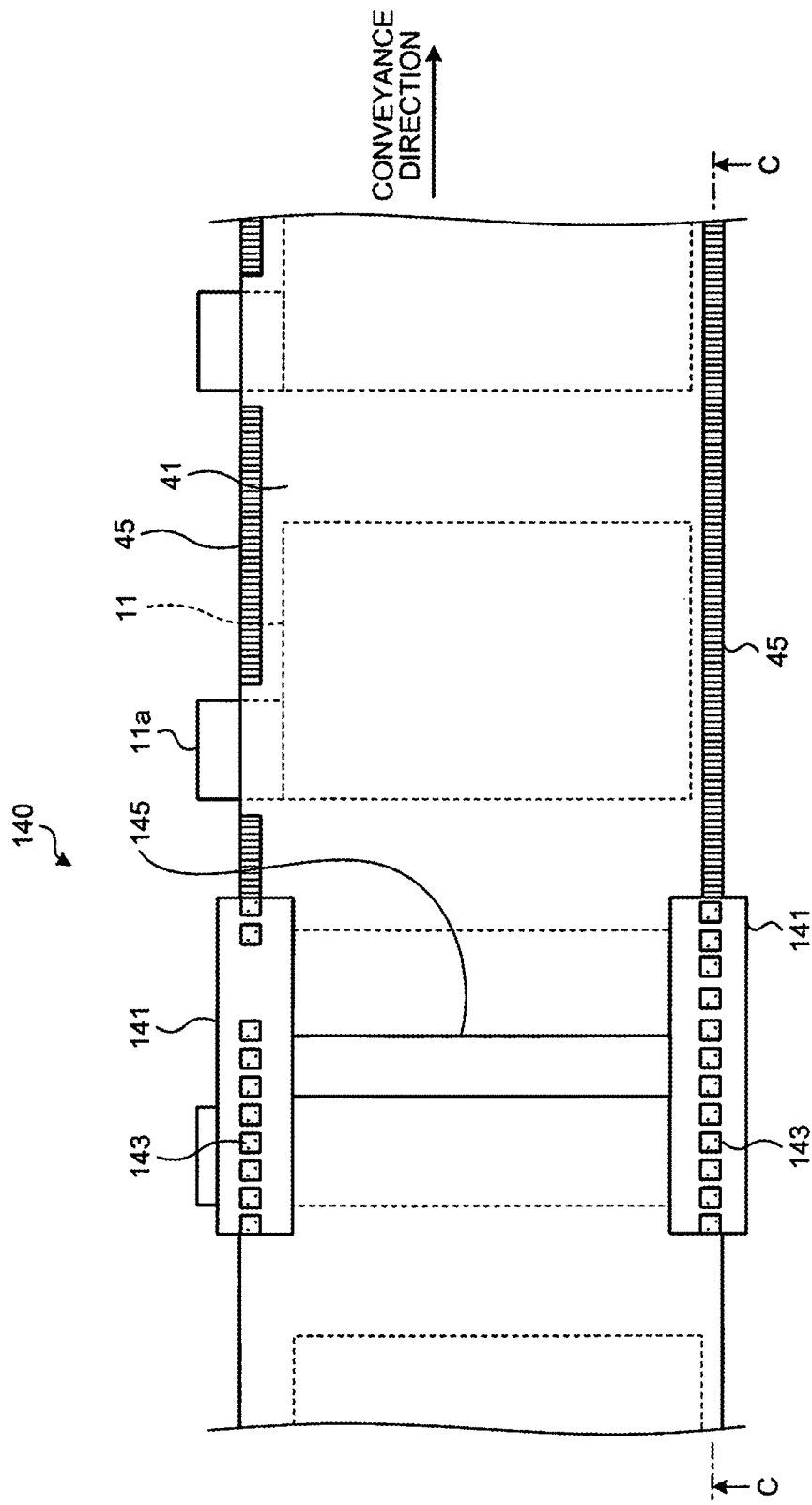

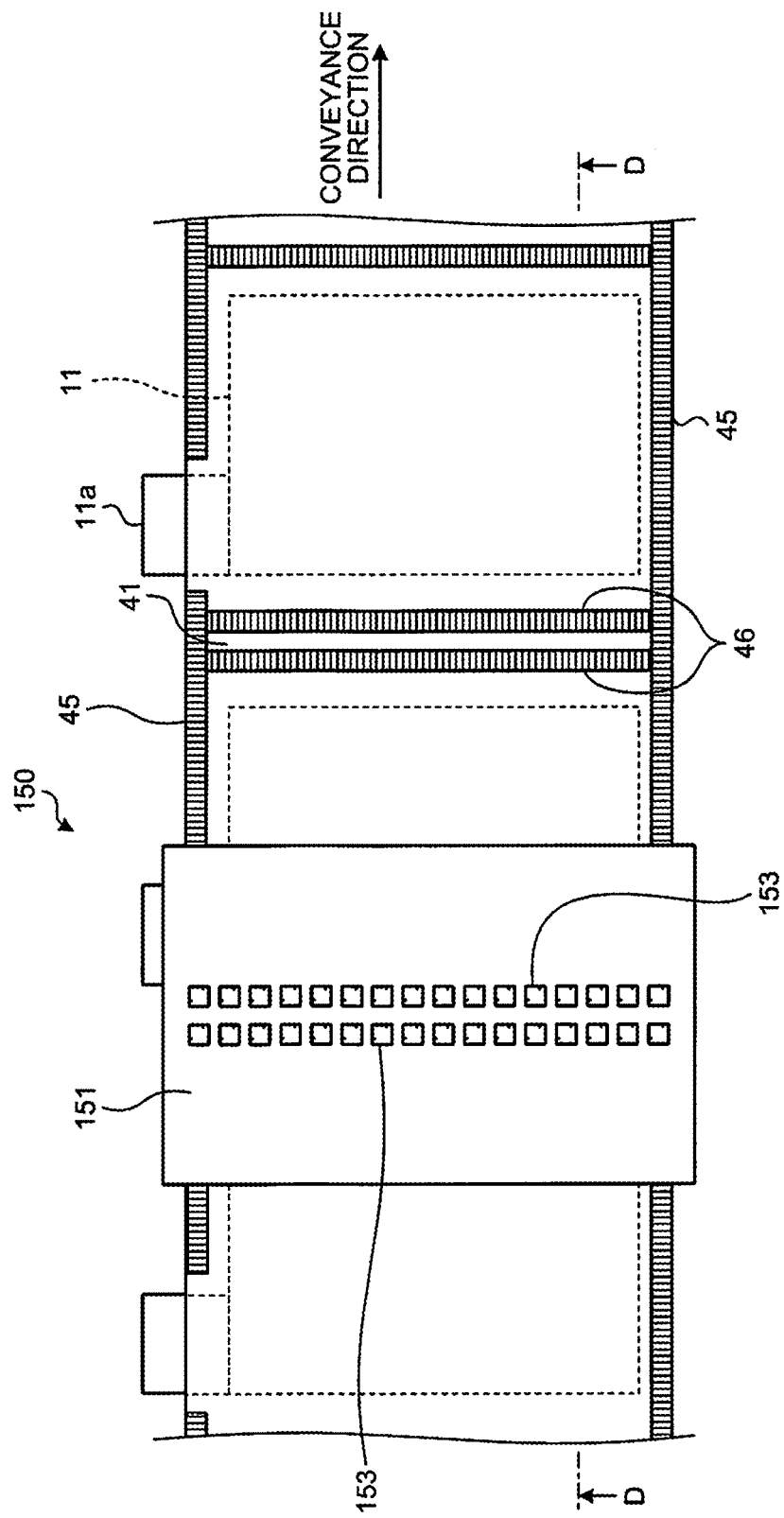

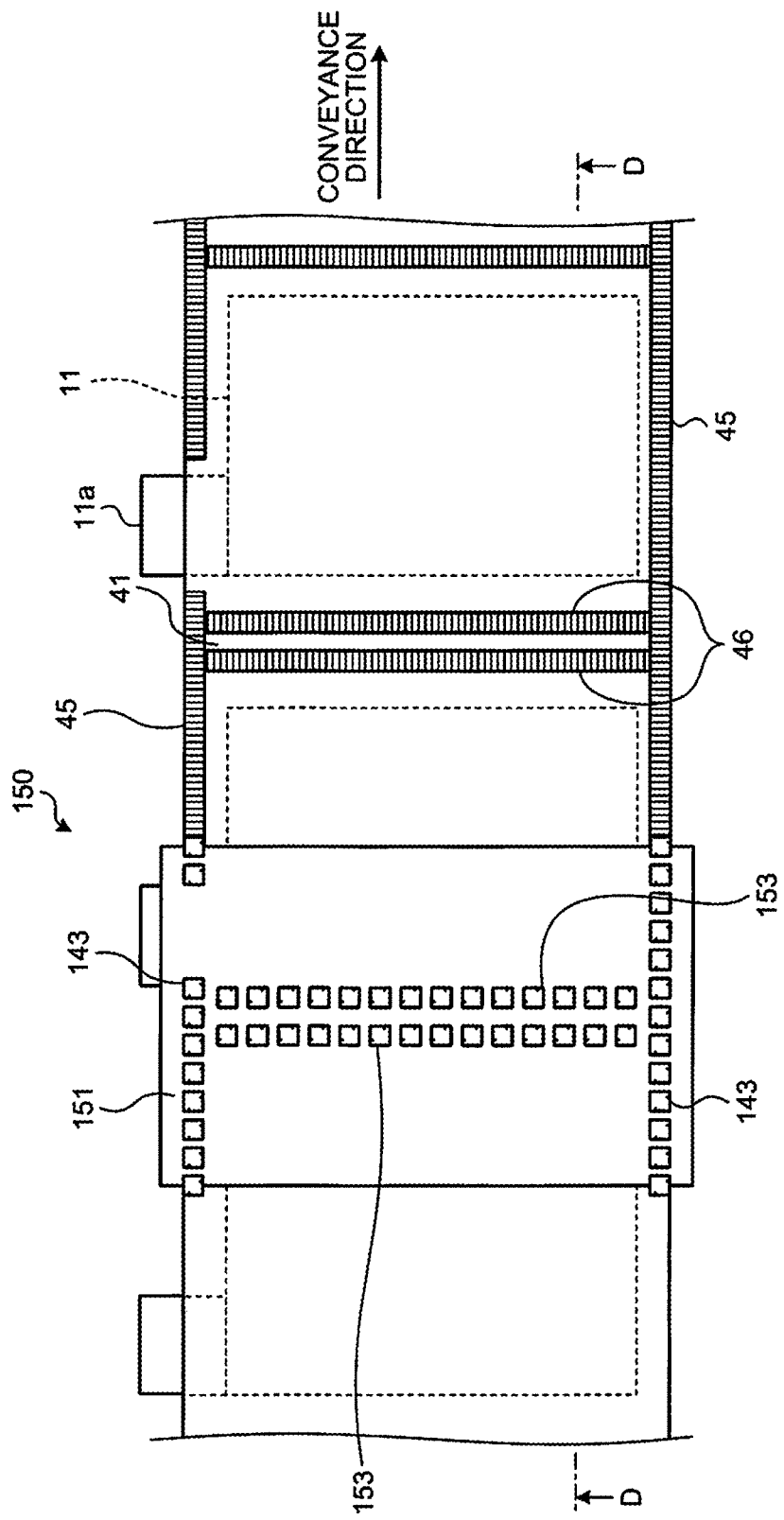

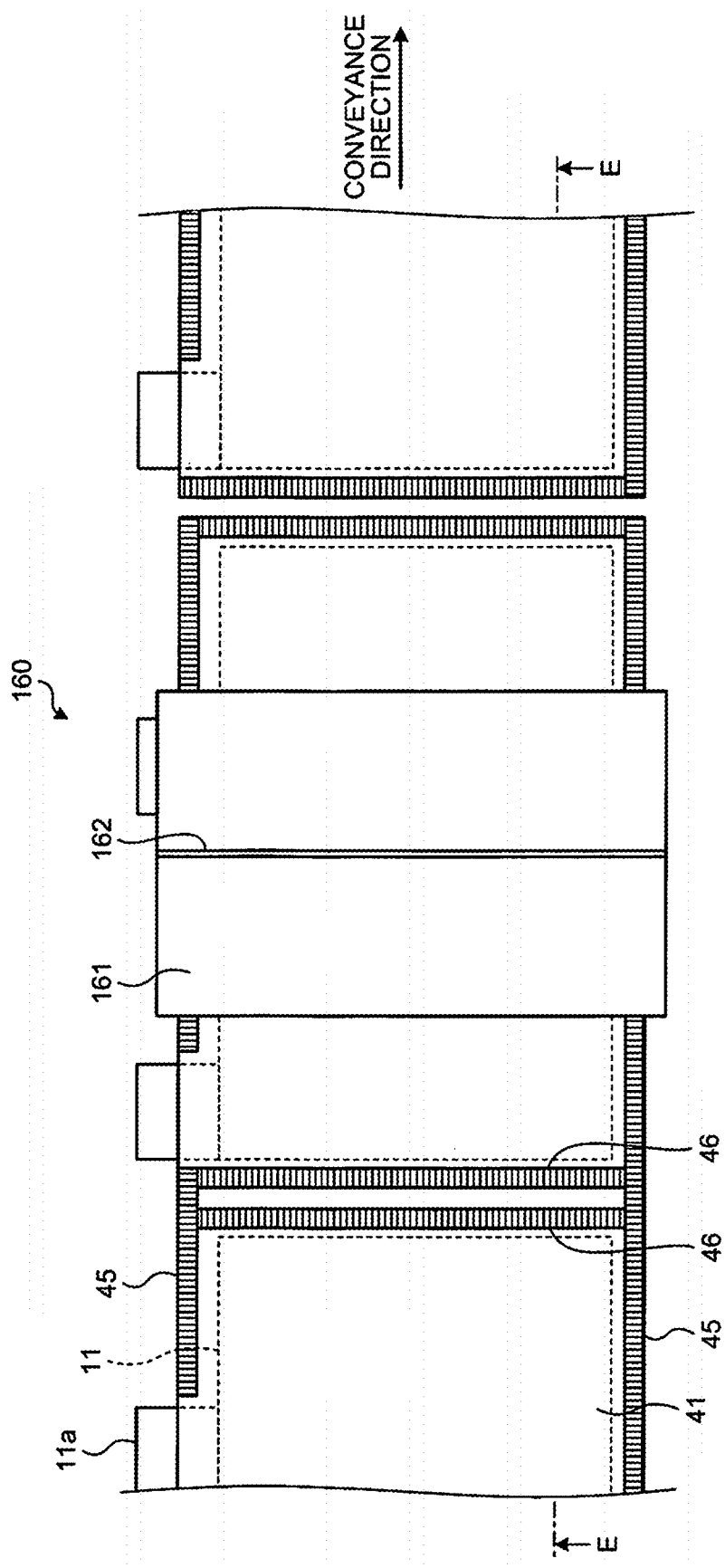

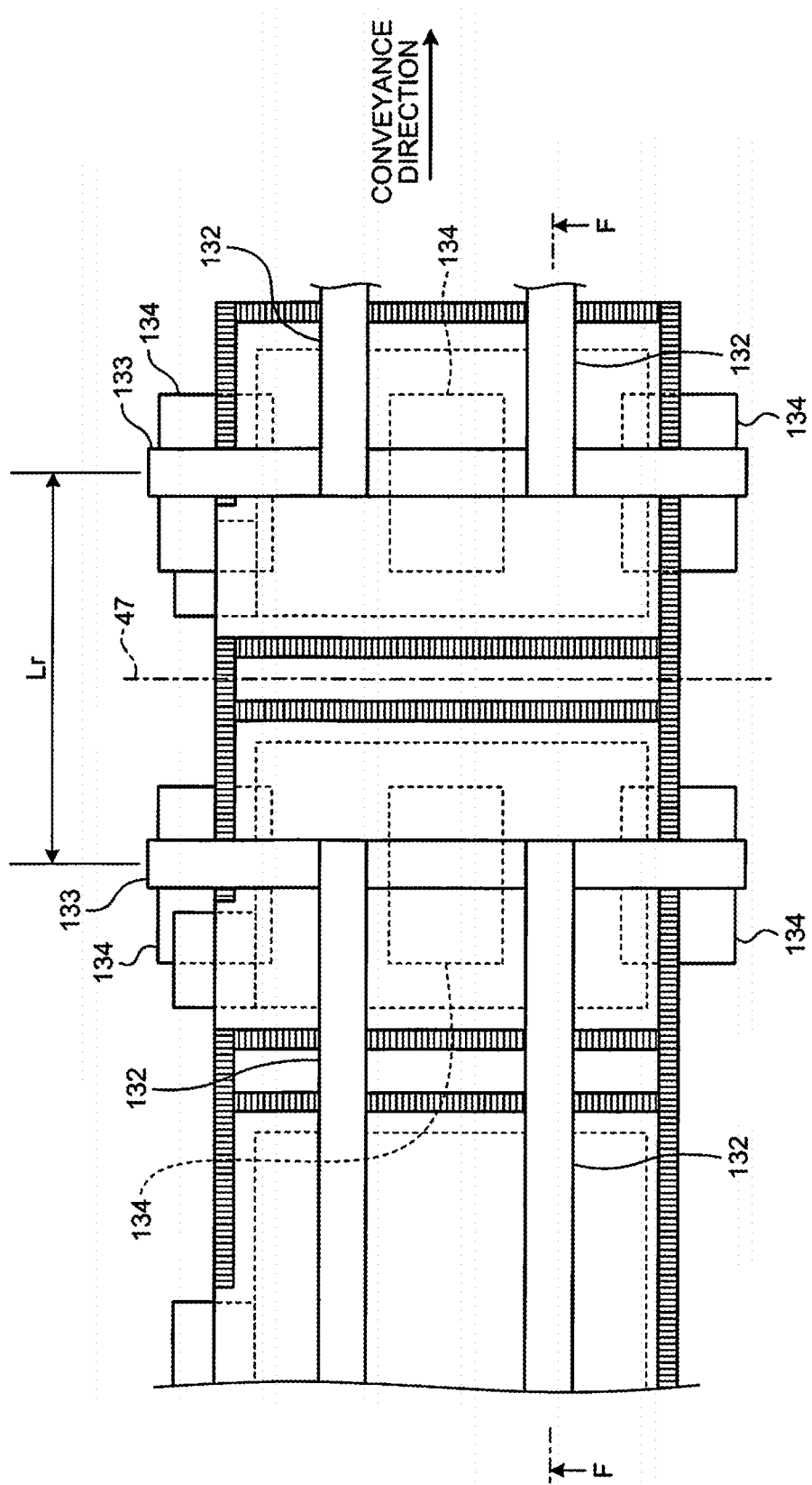

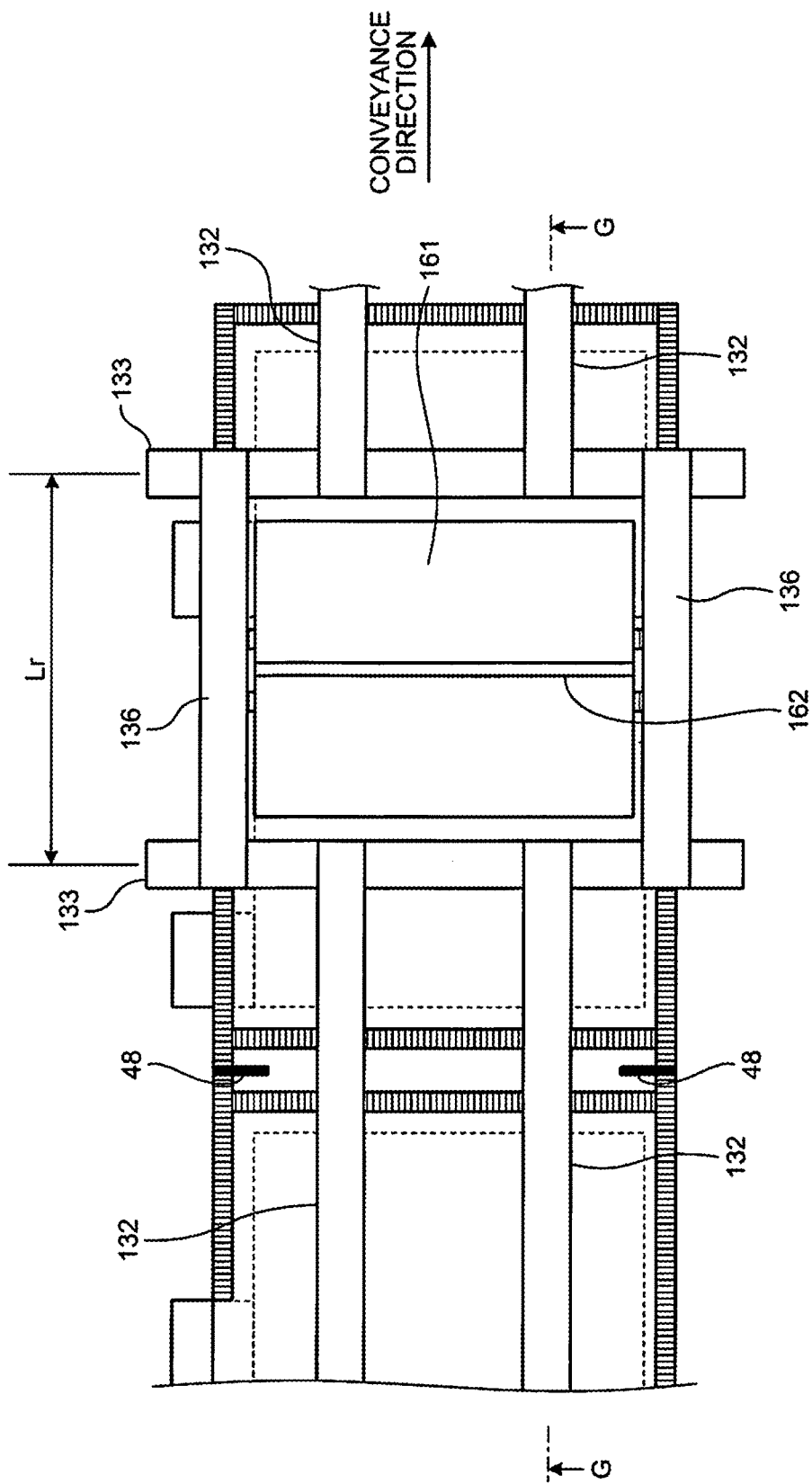

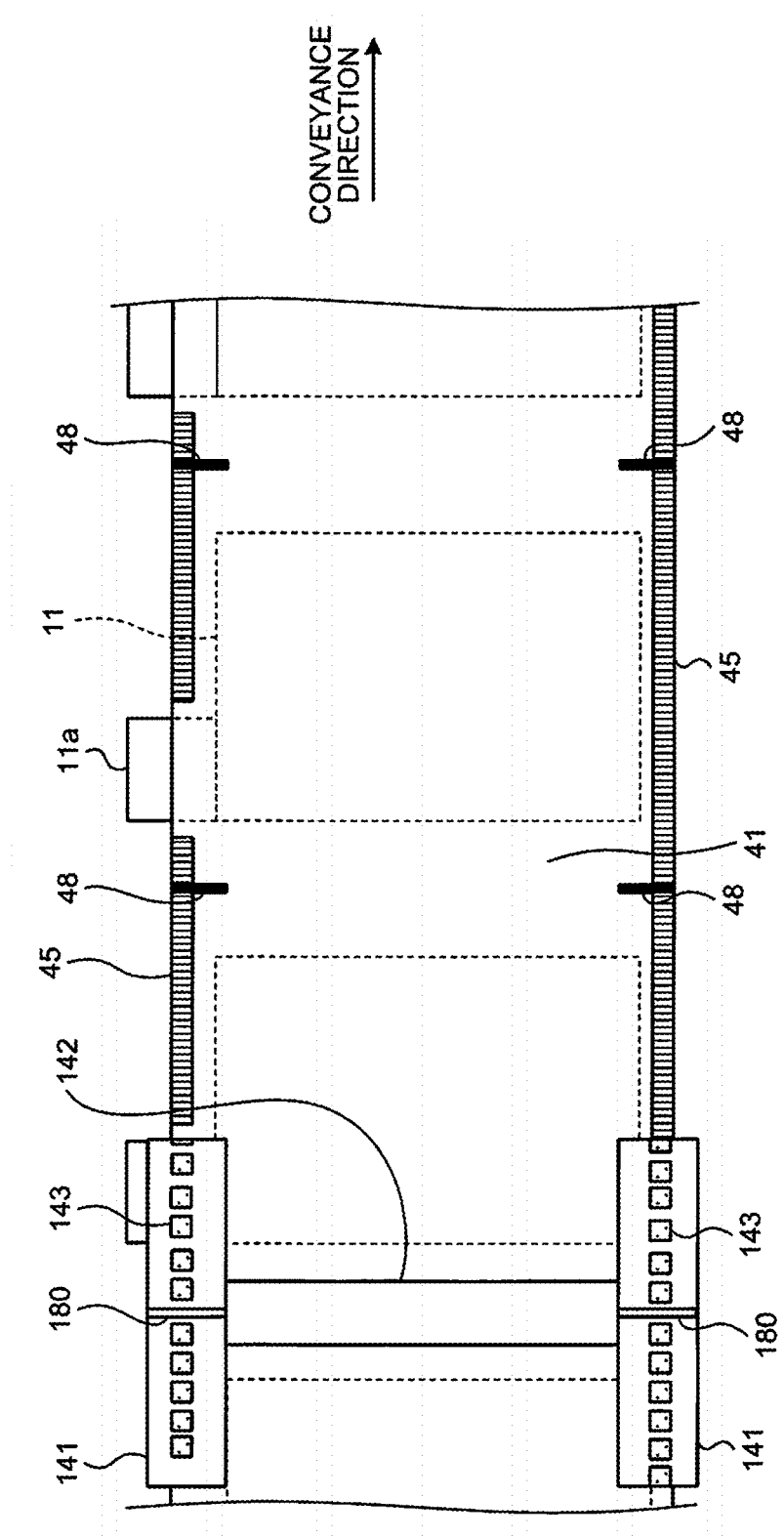

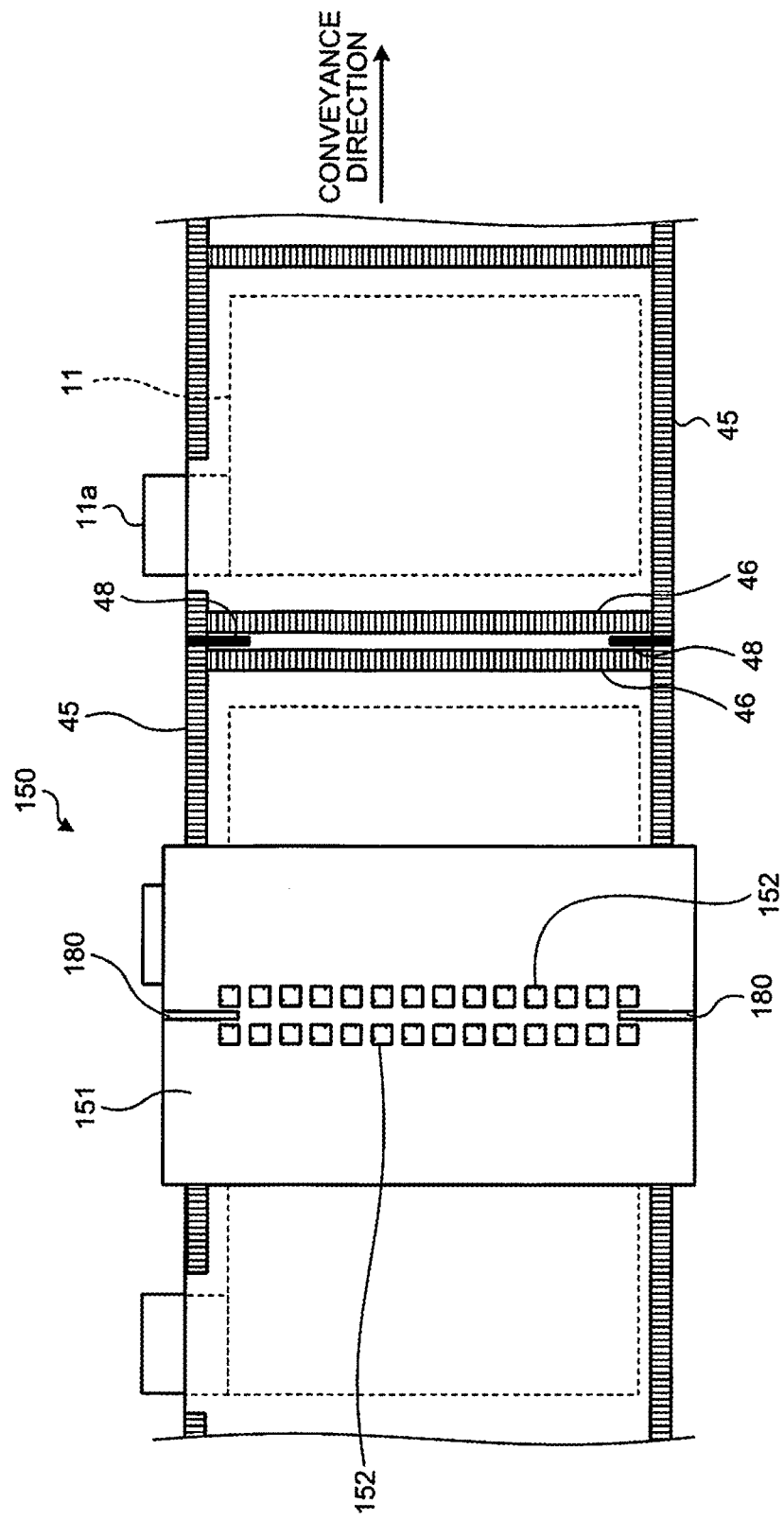

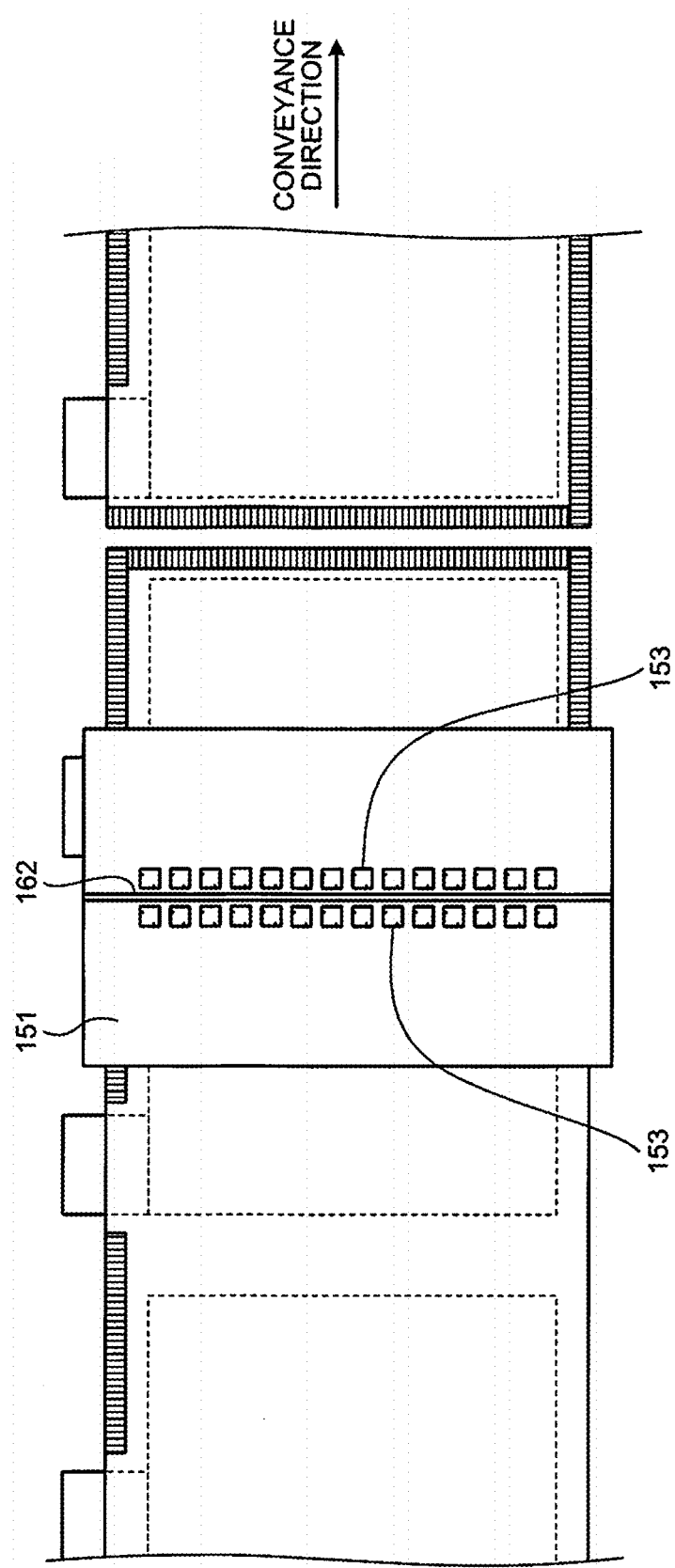

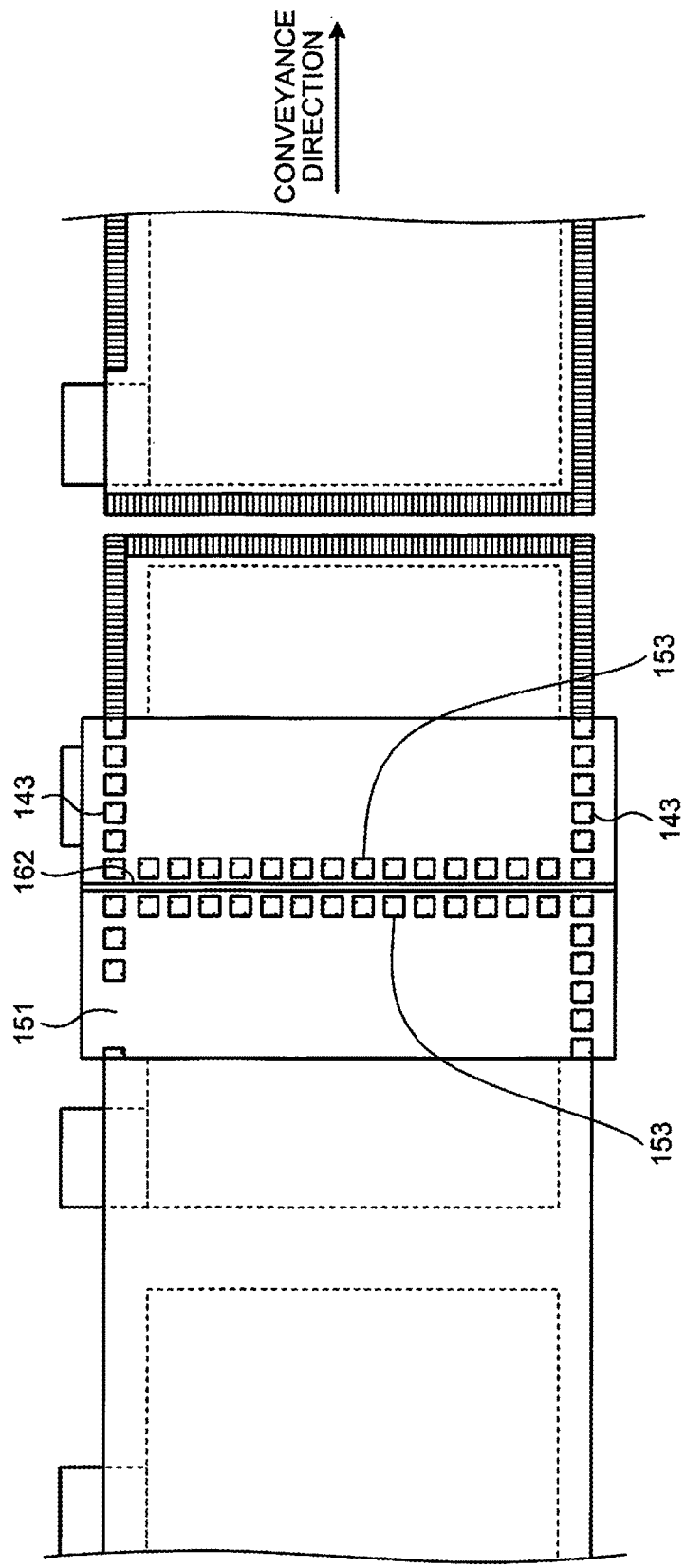

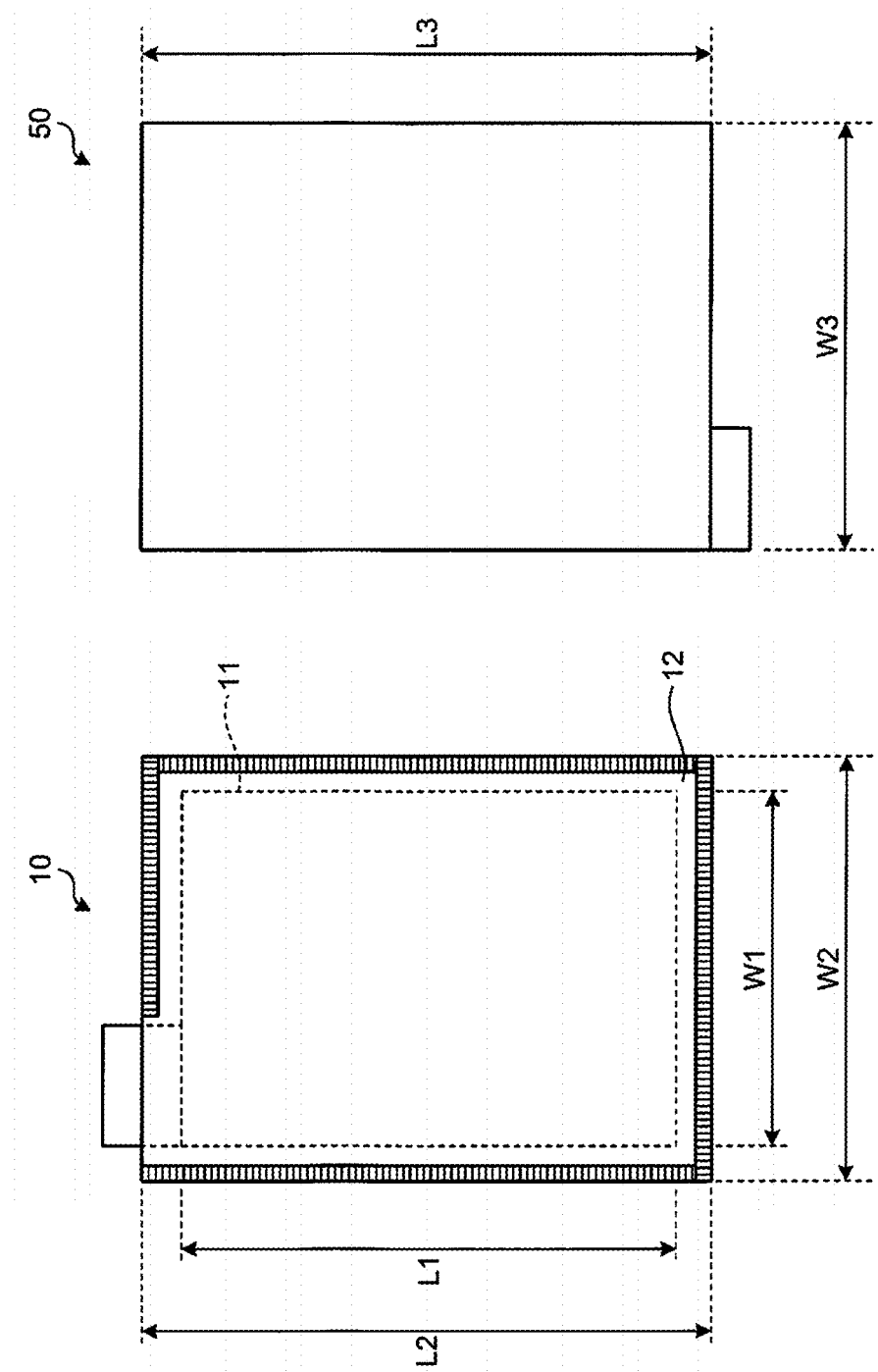

APPARATUS FOR MANUFACTURING BAGGED ELECTRODE, ACCUMULATING APPARATUS, AND METHOD FOR MANUFACTURING BAGGED ELECTRODE

CROSS-REFERENCE TO RELATED APPLICATIONS

This application is based upon and claims the benefit of priority from Japanese Patent Application No. 2019-168605, filed on Sep. 17, 2019; the entire contents of which are incorporated herein by reference.

FIELD

Embodiments described herein relate generally to an apparatus for manufacturing a bagged electrode, an accumulating apparatus, and a method for manufacturing the bagged electrode.

BACKGROUND

Widely known are various kinds of batteries having various forms. Some of the batteries are manufactured by coiling roll-shaped positive and negative electrodes insulated from each other with a separator interposed therebetween, flattening the coiled electrodes into an elliptical shape, and sealing them into a rectangular can, for example. This form, however, has many useless spaces between the elliptical battery and the can. There have also been developed laminated batteries manufactured by layering several combinations of a positive electrode, a separator, a negative electrode, and a separator having a sheet (rectangular) shape and accommodating the layered electrodes into a rectangular can. Laminated batteries have fewer useless spaces in the can. In the laminated batteries, however, the separators cut into the sheet shape are difficult to handle, making it complicated to accurately position and layer each separator between the positive electrode and the negative electrode.

To address this, there has been developed a method for manufacturing a laminated battery by manufacturing a bagged electrode with a first electrode (e.g., a positive electrode) of the battery interposed between a pair of separators and layering the bagged electrode and a second electrode (e.g., a negative electrode) alternately. Various methods are known for layering the bagged electrode and the second electrode alternately, including a method of layering the bagged electrode and the second electrode one by one by pick-and-place using a rotating robot arm and suction parts provided at the ends of the robot arm.

Such battery manufacturing techniques are required to achieve higher-speed manufacturing to improve the productivity in manufacturing a battery.

BRIEF DESCRIPTION OF THE DRAWINGS

FIG. 12A is a view for explaining a specific example of the mechanism of a conveying unit;
FIG. 12B is a plan view of the mechanism illustrated in FIG. 12A viewed from top;
FIG. 13A is a view for explaining an example where a posture controller is provided;
FIG. 14A is a view for explaining an exemplary configuration of a first bonding unit;
FIG. 15A is a view for explaining an exemplary configuration of a second bonding unit;
FIG. 17 is a view for explaining an example where the first bonding unit and the second bonding unit are integrated;
FIG. 18A is a view for explaining an exemplary configuration of a separating unit;
FIG. 20A is a view for explaining an example of the mechanism of the conveying unit near the separating unit;
FIG. 21A is a view for explaining another example of the mechanism of the conveying unit near the separating unit;
FIG. 22 is a view for explaining an example where a notch forming unit is integrated with the first bonding unit;
FIG. 23 is a view for explaining an example where the notch forming unit is integrated with the second bonding unit;
FIG. 24 is a view for explaining an example where the second bonding unit and the separating unit are integrated;
FIG. 25 is a view for explaining an example where the first bonding unit, the second bonding unit, and the separating unit are integrated.

FIG. 30 is a view for explaining the size of the bagged electrode.

DETAILED DESCRIPTION

Figure 1A:
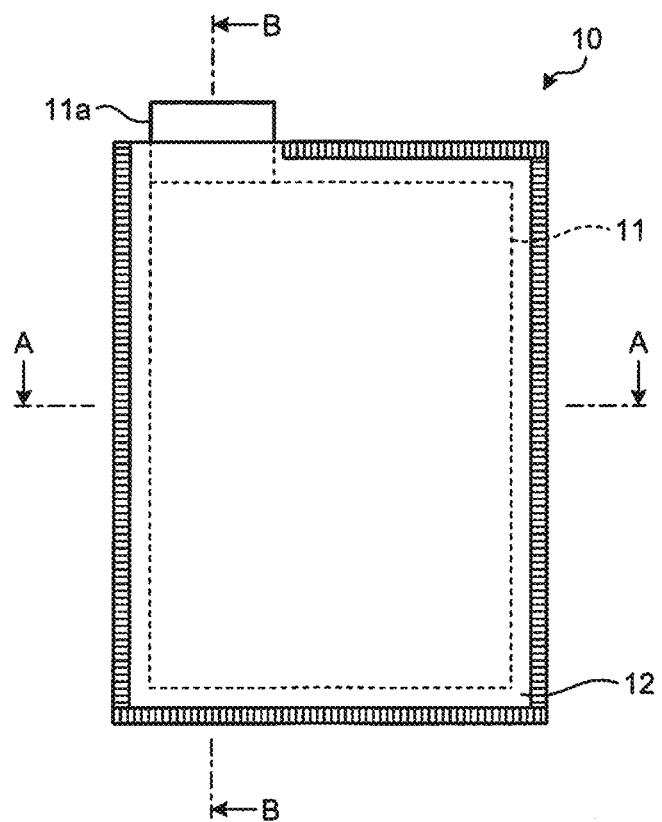
FIG. 1A is a plan view of an example of a bagged electrode.

According to one embodiment, an apparatus for manufacturing a bagged electrode includes a conveying unit, a first bonding unit, a second bonding unit, and a separating unit. The conveying unit conveys an electrode in a manner interposed between a pair of long separator materials unwound from a pair of rolls. The first bonding unit bonds the pair of long separator materials outside the electrode along a conveyance direction without stopping conveyance of the electrode and the pair of long separator materials. The second bonding unit bonds the pair of long separator materials outside the electrode along a direction intersecting the conveyance direction without stopping conveyance of the electrode and the pair of long separator materials. The separating unit cuts the pair of long separator materials along the direction intersecting the conveyance direction to cut off the bagged electrode without stopping conveyance of the electrode and the pair of long separator materials.

Exemplary embodiments according to the present invention are described below in greater detail with reference to the accompanying drawings. The size and the ratio in the drawings are exaggerated for the convenience of explanation and may possibly be different from the actual ratio.

Figure 1B:
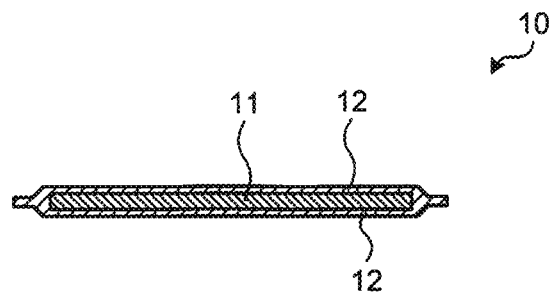
FIG. 1B is a sectional view along line A-A of FIG. 1A.
Figure 1C:
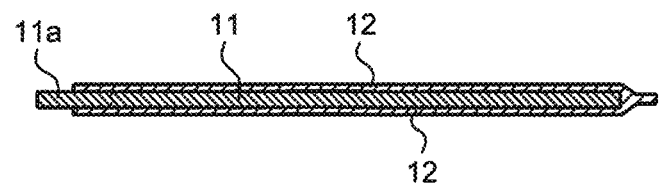
FIG. 1C is a sectional view along line B-B of FIG. 1A.

A bagged electrode manufactured by a manufacturing apparatus according to the embodiment is described first. FIG. 1A is a plan view of an example of a bagged electrode 10. FIG. 1B is a sectional view along line A-A of FIG. 1A. FIG. 1C is a sectional view along line B-B of FIG. 1A.

The bagged electrode 10 includes a first electrode 11 (e.g., a positive electrode) out of positive and negative electrodes of a battery and a pair of upper and lower separators 12 that interposes the electrode 11. The electrode 11 is cut into a sheet (rectangular) shape and interposed between the pair of separators 12 from both sides such that only a tab 11a is exposed to the outside. The pair of separators 12 is bonded outside the electrode 11 and seals the electrode 11 therein. The bagged electrode 10 is used as a battery element constituting a laminated battery.

A typical laminated battery is manufactured by layering sheet-like positive and negative electrodes alternately with the separator 12 for insulating them interposed therebetween. The separator 12, however, is a thin film and difficult to handle in high-speed conveyance, for example, in a battery manufacturing process. To address this, the present embodiment covers both surfaces of the first electrode 11 (e.g., the positive electrode) of the battery with the separators 12 and handles the electrode 11 integrated with the separators 12 as the bagged electrode 10. By layering the bagged electrode and a second electrode (e.g., the negative electrode) alternately, the laminated battery can be manufactured efficiently.

Figure 2:
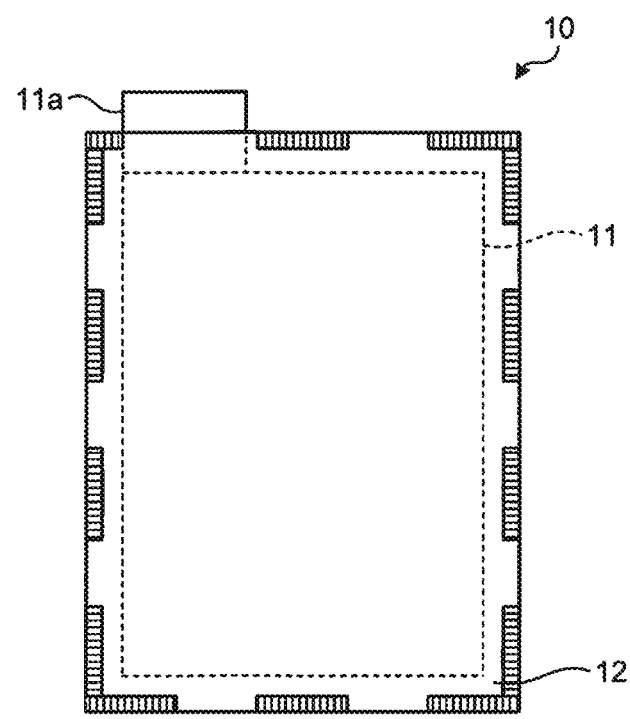
FIG. 2 is a view for explaining another example of a bonding portion.

As illustrated in FIG. 1A, for example, a bonding portion between the pair of separators 12 constituting the bagged electrode 10 may be the whole periphery outside the electrode 11 other than the tab 11a. Alternatively, as illustrated in FIG. 2, for example, the pair of separators 12 may be bonded not on the whole periphery outside the electrode 11 but at an intermittent bonding portion. In this case, the pair of separators 12 is preferably bonded at at least the corners of the bagged electrode 10.

Figure 3A:
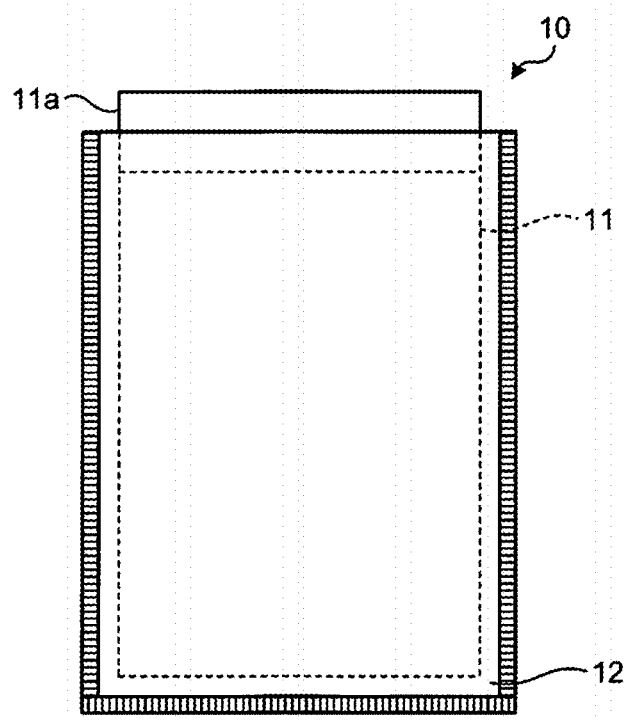
FIG. 3A is a view for explaining an example of an electrode provided with a tab having a different shape.
Figure 3B:
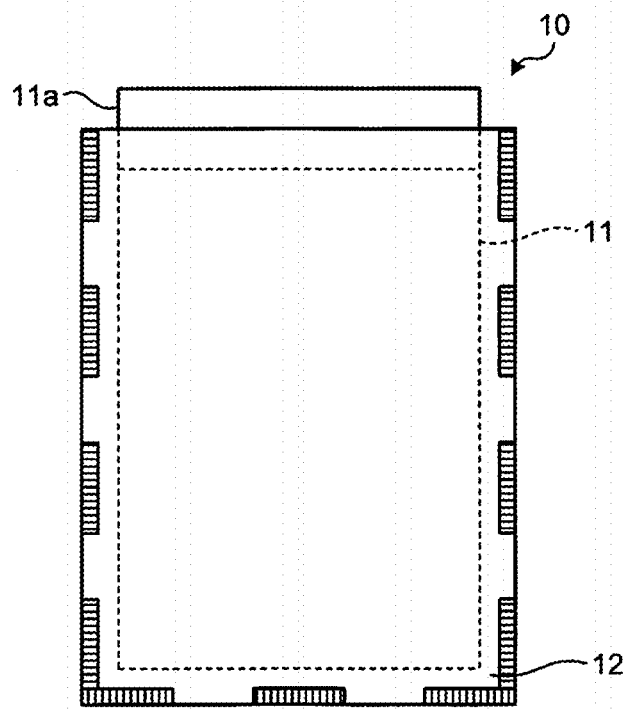
FIG. 3B is a view for explaining another example of the electrode provided with a tab having a different shape.

The shape of the electrode 11 used for the bagged electrode 10 is not limited to the shape illustrated in FIG. 1A. As illustrated in FIGS. 3A and 3B, for example, the tab 11a may have the same length as one of the sides of the electrode 11.

Figure 4:
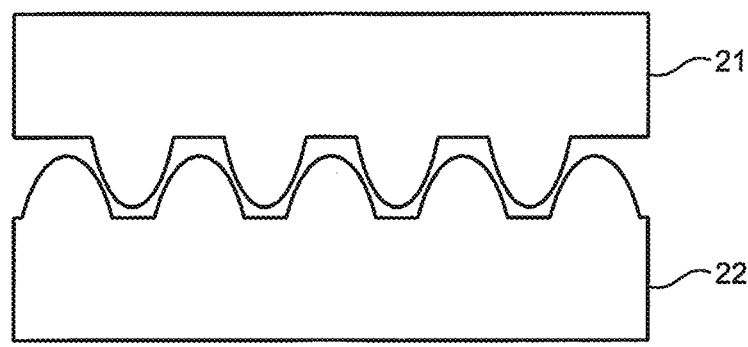
FIG. 4 is a view for explaining a press-lock bonding method.

To bond the pair of separators 12, a press-lock method can be used, for example. As illustrated in FIG. 4, the press-lock method is a mechanical crimping method for bonding an object to be bonded by interposing the object to be bonded between a pair of upper and lower tooth members 21 and 22 that engages each other and applying pressure to the object. The press-lock method does not require a heating unit unlike a heat-melting method and is used for a stapleless stapler that staples paper without using any staple, for example.

The configuration that bonds the pair of separators 12 by the press-lock method is effective especially when the separators 12 constituting the bagged electrode 10 are made of paper. Specifically, the paper separators 12 can be crimped by appropriate pressure and the shape of the tooth members without forming any hole because they have an interlacing fibrous structure. The paper separators 12 can be crimped by lower pressure than resin separators.

Figure 5:
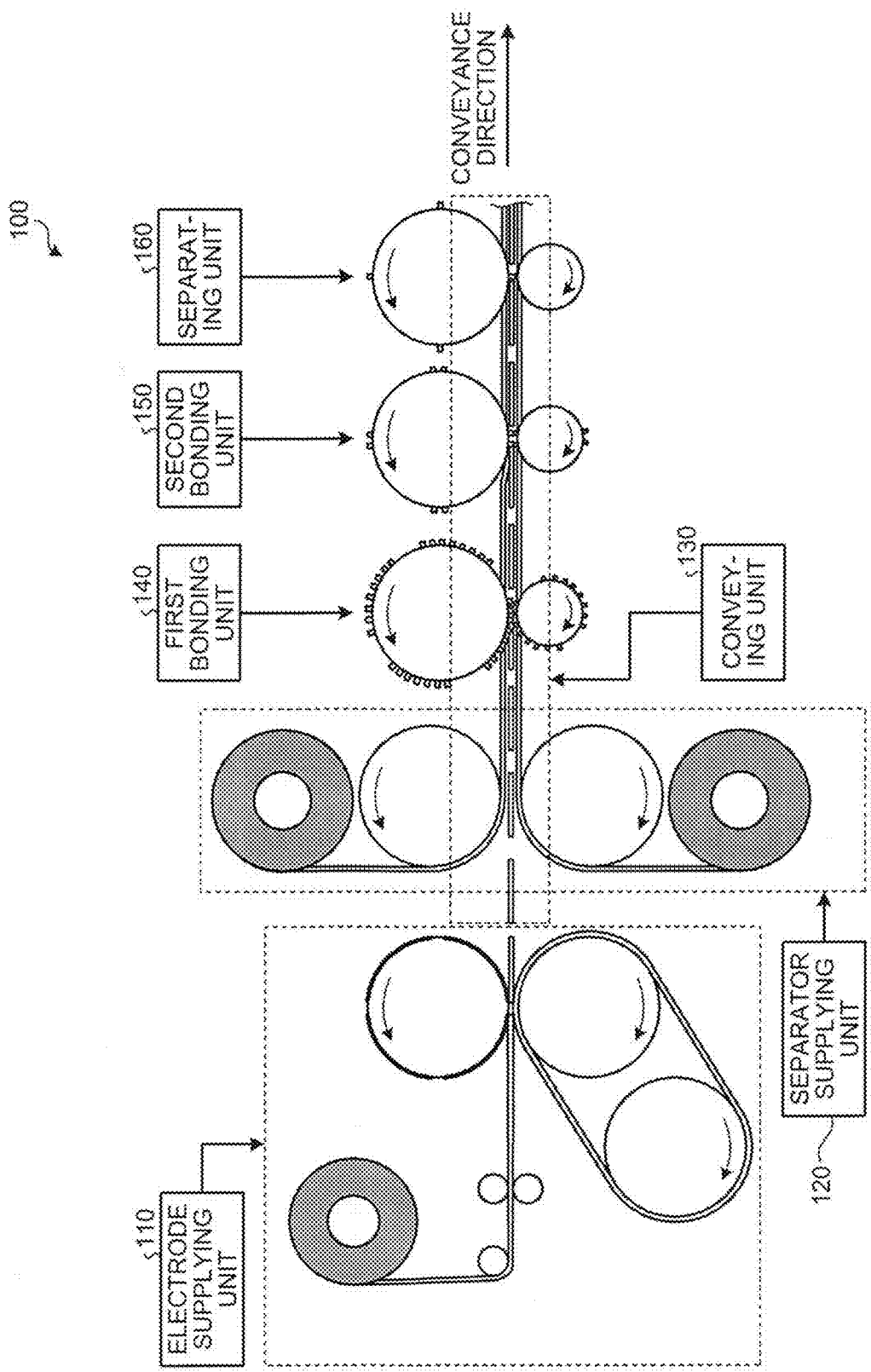
FIG. 5 is a view schematically illustrating the entire configuration of a bagged electrode manufacturing apparatus according to an embodiment.

FIG. 5 is a view schematically illustrating the entire configuration of a bagged electrode manufacturing apparatus according to the present embodiment. As illustrated in FIG. 5, a bagged electrode manufacturing apparatus 100 according to the present embodiment includes an electrode supplying unit 110, a separator supplying unit 120, a conveying unit 130, a first bonding unit 140, a second bonding unit 150, and a separating unit 160.

Figure 6:
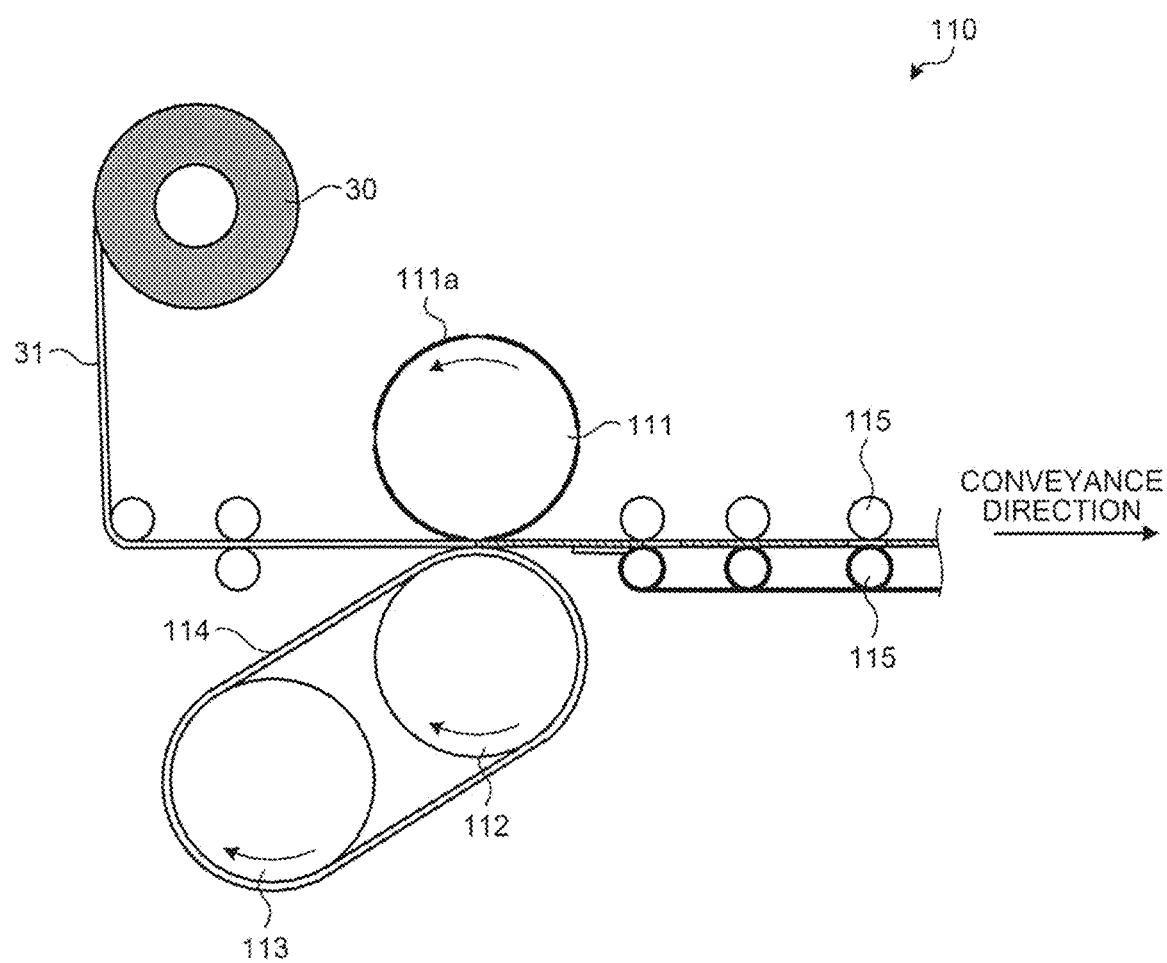
FIG. 6 is a view for explaining an exemplary configuration of an electrode supplying unit.

The electrode supplying unit 110 is a mechanism that supplies the electrode 11 constituting the bagged electrode 10. An exemplary configuration of the electrode supplying unit 110 is illustrated in FIG. 6. As illustrated in FIG. 6, the electrode supplying unit 110 cuts a long electrode material 31 unwound from an electrode roll 30 into a sheet shape to manufacture the electrode 11 constituting the bagged electrode 10 and supplies the electrode 11 to the conveying unit 130. The electrode roll 30 is a roll-shaped wound electrode material 31 serving as the material of the electrode 11.

To cut the electrode material 31 into a sheet shape, a rotary die-cut method is used, for example. Specifically, the long electrode material 31 unwound from the electrode roll 30 is pressed against the peripheral surface of a drum-like rotator 111 provided with cutting-out blades 111a having the shape corresponding to the outer shape of the electrode 11 on its peripheral surface while rotating the rotator 111. As a result, the electrodes 11 are cut out.

Figure 7:
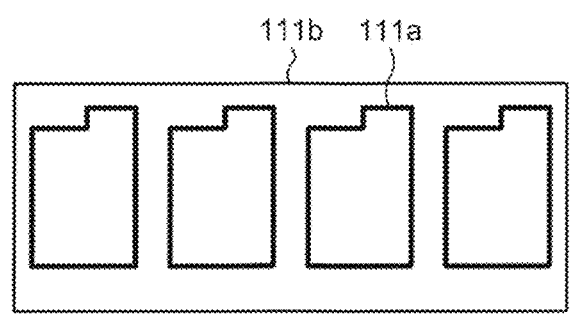
FIG. 7 is a development of a cutting-out blade.

As illustrated in FIG. 7, for example, the cutting-out blade 111a may be formed by performing etching or other processing on a thin plate 111b made of a magnetic material and magnetically attached to the peripheral surface of the base member of the rotator 111. Alternatively, the cutting-out blade 111a may be formed by performing etching or other processing directly on the peripheral surface of the rotator 111.

A roller 112 is disposed at a position facing the rotator 111 with the electrode material 31 interposed therebetween. A thin resin film 114 is wound around the roller 112 and a roller 113. The resin film 114 moves around the rollers 112 and 113 by rotation of the roller 112 in conjunction with rotation of the rotator 111 and receives the cutting-out blade 111a of the rotator 111 passing through the electrode material 31. The cutting-out blade 111a of the rotator 111 passes through the electrode material 31 and reaches the middle of the resin film 114 in the thickness direction. With this configuration, the electrode supplying unit 110 can cut off the electrode 11 from the electrode material 31 without leaving any part of the electrode 11. The resin film 114 is replaced regularly because cut marks are left on it. Alternatively, the resin film 114 may be a self-repairing film. In this case, the resin film 114 need not be replaced frequently and can be used for a long time.

Figure 8:
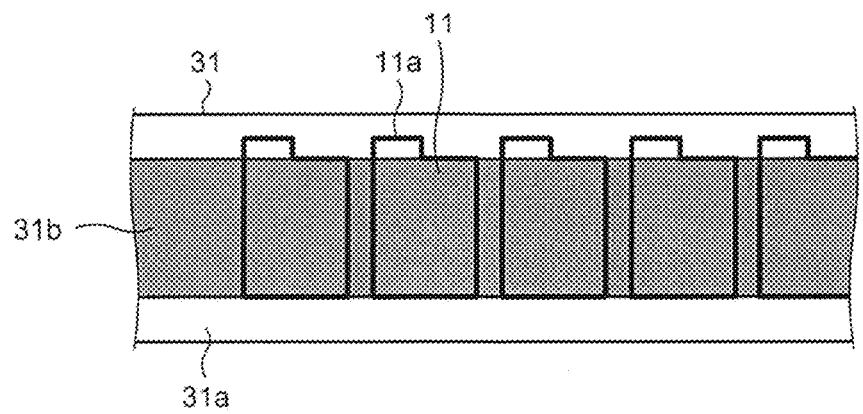
FIG. 8 is a view of manufacturing electrodes.

FIG. 8 is a view of manufacturing the electrodes 11 by the electrode supplying unit 110. The electrode material 31 is aluminum foil 31a with an active material 31b applied to the center. The electrode supplying unit 110 presses the cutting-out blades 111a having the shape illustrated in FIG. 7 against the electrode material 31 while rotating the rotator 111, thereby sequentially manufacturing the electrodes 11 having the shape illustrated in FIG. 8. The tab 11a of the electrode 11 is made of the aluminum foil 31a of the electrode material 31 with no active material 31b applied thereto.

Figure 9:
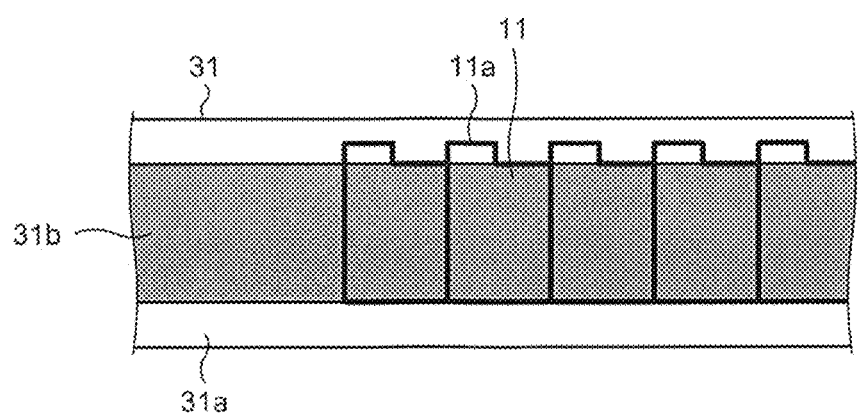
FIG. 9 is another view of manufacturing the electrodes.
Figure 10A:
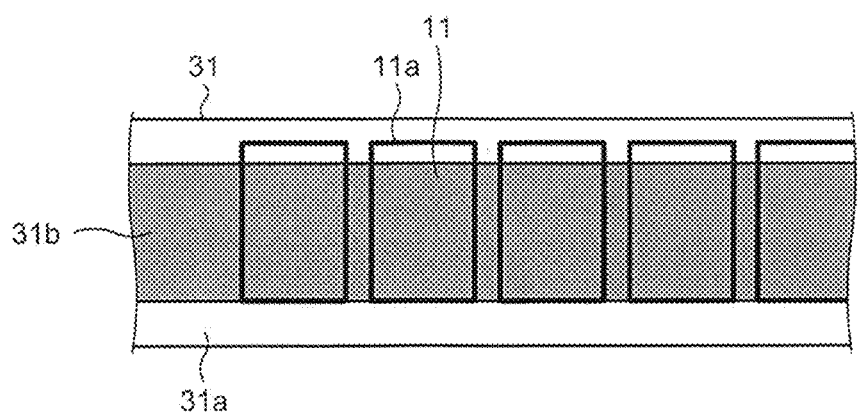
FIG. 10A is a view of manufacturing the electrodes.
Figure 10B:
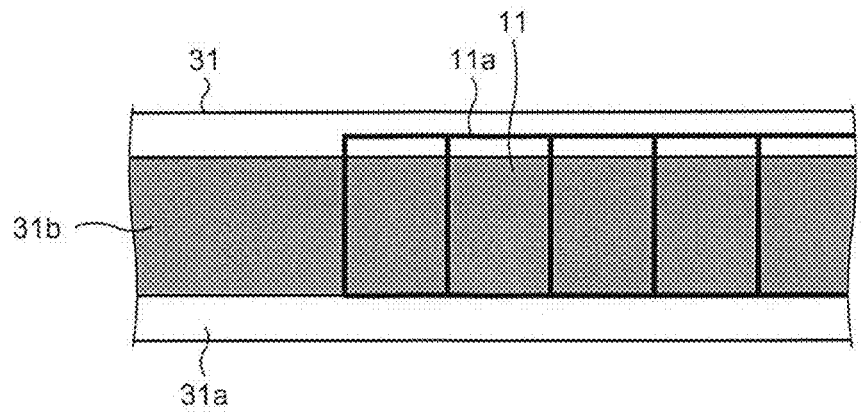
FIG. 10B is another view of manufacturing the electrodes.

While FIG. 8 illustrates an example where a plurality of electrodes 11 are manufactured sequentially with a gap interposed therebetween, the electrode supplying unit 110 can manufacture the electrodes with no gap interposed therebetween as illustrated in FIG. 9 by changing the positions of the cutting-out blades 111a. By changing the shape of the cutting-out blade 111a, the electrode supplying unit 110 can manufacture the electrode 11 (electrode 11 having the shape illustrated in FIGS. 3A and 3B) with the tab 11a having the same length as one of the sides of the electrode 11 as illustrated in FIGS. 10A and 10B.

Figure 11:
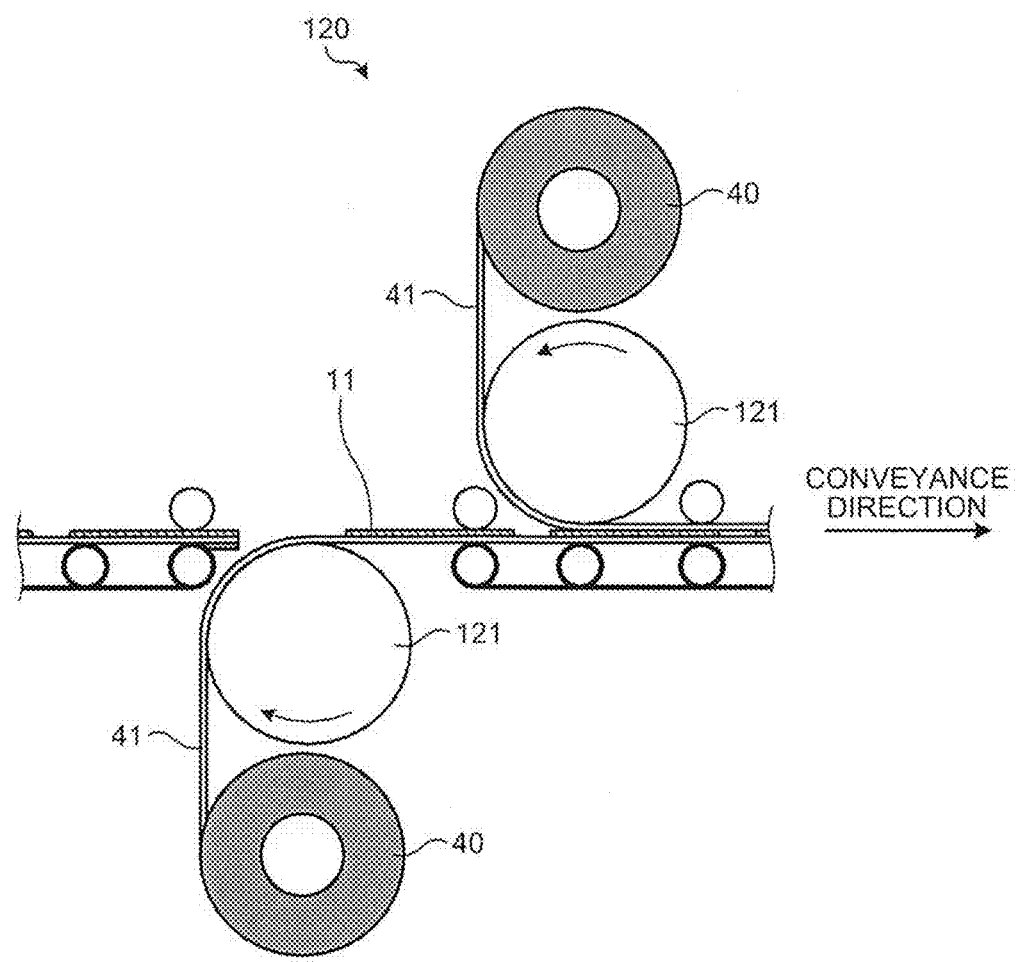
FIG. 11 is a view for explaining an exemplary configuration of a separator supplying unit.

The separator supplying unit 120 is a mechanism that supplies a separator material serving as the material of the separators 12 constituting the bagged electrode 10. The separators 12 constituting the bagged electrode 10 according to the present embodiment are made of paper. Alternatively, the separator material may be made of resin. FIG. 11 illustrates an exemplary configuration of the separator supplying unit 120. As illustrated in FIG. 11, the separator supplying unit 120 unwinds long-length separator materials (hereinafter, referred to as "long separator materials") from a pair of upper and lower separator rolls 40 by rotation of respective unwinding rollers 121 and supplies a pair of upper and lower long separator materials 41 to the conveying unit 130. The separator roll 40 is a roll-shaped wound long separator material 41.

The conveying unit 130 conveys the electrode 11 supplied from the electrode supplying unit 110 and the pair of long separator materials 41 supplied from the separator supplying unit 120 to the downstream side in the conveying direction. In particular, the conveying unit 130 conveys, to the downstream side, the electrode 11 supplied from the electrode supplying unit 110 in a manner interposed between the pair of long separator materials 41 supplied from the separator supplying unit 120. The conveying unit 130 does not stop conveying the electrode 11 and the pair of long separator materials 41 when processing is performed by the first bonding unit 140, the second bonding unit 150, and the separating unit 160, which will be described later.

FIG. 12A is a view for explaining a specific example of the mechanism of the conveying unit 130. FIG. 12B is a plan view of the mechanism illustrated in FIG. 12A viewed from top. While FIGS. 12A and 12B illustrate a conveyance path along which the electrode 11 supplied from the electrode supplying unit 110 is conveyed to the downstream side in a manner interposed between the pair of long separator materials 41 supplied from the separator supplying unit 120, the same mechanism is provided to the conveyance path on the downstream side.

A plurality of lower conveyance rollers 131 are disposed at predetermined intervals under the conveyance path of the conveying unit 130. A suction conveyance belt 132 is wound around a plurality of lower conveyance rollers 131 at predetermined positions. The electrode 11 supplied from the electrode supplying unit 110 and the long separator materials 41 supplied from the separator supplying unit 120 are placed on the suction conveyance belt 132. The electrode 11 and the long separator materials 41 are sucked and are conveyed to the downstream side by the suction conveyance belt 132 by rotation of the suction conveyance belt 132 in conjunction with rotation of the lower conveyance rollers 131.

A plurality of upper conveyance rollers 133 are disposed facing the respective lower conveyance rollers 131 above the conveyance path of the conveying unit 130. The upper conveyance rollers 133 hold down the electrode 11 and the long separator materials 41 sucked and conveyed to the downstream side by the suction conveyance belt 132. In the same manner as the part under the conveyance path, a suction conveyance belt may be wound around a plurality of upper conveyance rollers 133 at predetermined positions above the conveyance path. In this case, the electrode 11 and the long separator materials 41 are conveyed in a manner interposed between the upper and lower suction conveyance belts. The upper conveyance rollers 133 are not necessarily disposed facing the respective lower conveyance rollers 131. The upper conveyance rollers 133, for example, may be disposed in a manner deviated from the positions facing the respective lower conveyance rollers 131.

As a result of cutting out the electrodes 11 from the electrode material 31 by the electrode supplying unit 110 as described above, there are a remaining part of the electrode material 31 left by the cutting-out. The remaining part of the electrode material 31 is separated from the electrodes 11 while the electrodes 11 are being conveyed to the downstream side and is wound around and collected by a winding roller 115.

At the part where the electrode 11 merges with the long separator materials 41 on the conveyance path of the conveying unit 130, the electrode 11 sucked and conveyed by the suction conveyance belt 132 is placed on the long separator material 41 unwound from the lower separator roll 40 by the lower unwinding roller 121 of the separator supplying unit 120. Subsequently, the long separator material 41 unwound from the upper separator roll 40 by the upper unwinding roller 121 is overlapped so as to interpose the electrode 11. As a result, the electrode 11 is conveyed to the downstream side in a manner interposed between the pair of upper and lower long separator materials 41.

Guide members 134 are disposed between the rotator 111 of the electrode supplying unit 110 and the suction conveyance belt 132 and between the suction conveyance belt 132 and the lower unwinding roller 121 of the separator supplying unit 120, for example. With the guide members 134, the electrode 11 cut out by the rotator 111 can be moved onto the suction conveyance belt 132 without falling off. In addition, the electrode 11 sucked and conveyed by the suction conveyance belt 132 can be moved onto the long separator material 41 unwound from the lower unwinding roller 121 without falling off.

Figure 13B:
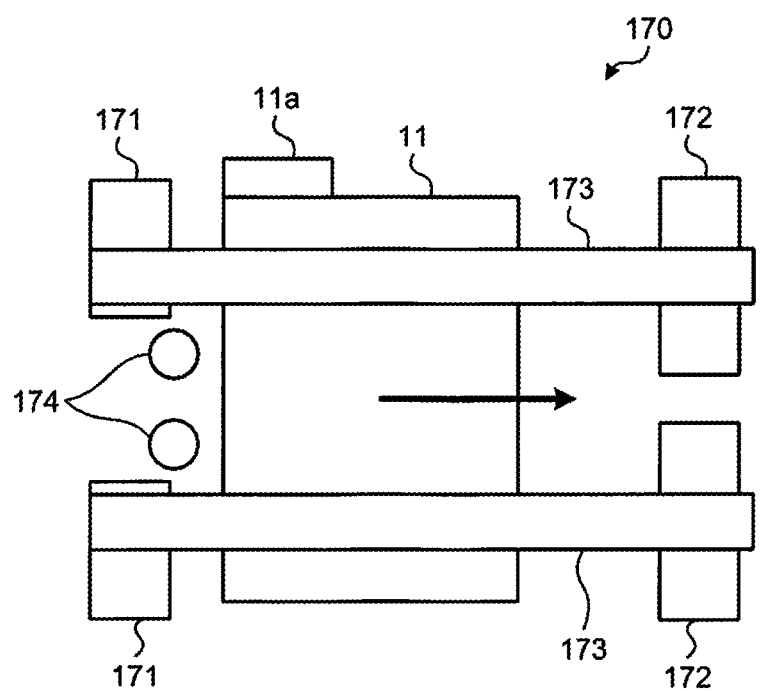
FIG. 13B is a plan view of the posture controller viewed from top.

The conveyance path between the electrode supplying unit 110 and the separator supplying unit 120 may be provided with a posture controller. The posture controller corrects the inclination of the electrode 11 sucked and conveyed by the suction conveyance belt 132 with respect to the conveyance direction. FIG. 13A is a view for explaining an example where a posture controller 170 is provided to the conveyance path between the electrode supplying unit 110 and the separator supplying unit 120. FIG. 13B is a plan view of the posture controller 170 viewed from top.

The posture controller 170 controls the conveyance speed independently at two positions in the direction intersecting the conveyance direction of the electrode 11, thereby correcting the inclination of the electrode 11 with respect to the conveyance direction. As illustrated in FIGS. 13A and 13B, let us assume a case where the electrode 11 is conveyed in a manner held at two positions in the direction intersecting the conveyance direction by conveyance belts 173 each wound around rollers 171 and 172, for example. In this case, the posture controller 170 makes the speed of rotation of the conveyance belts 173 at the two positions different depending on the inclination of the electrode 11 with respect to the conveyance direction. To calculate the inclination of the electrode 11 with respect to the conveyance direction, sensors 174 are provided that detect the leading end of the conveyed electrode 11 at two positions in the direction intersecting the conveyance direction of the electrode 11 as illustrated in FIG. 13B, for example. The inclination can be calculated from a time difference between the times when the two sensors 174 detect the leading end of the electrode 11.

As described above, the posture controller 170 is provided to the conveyance path between the electrode supplying unit 110 and the separator supplying unit 120 to correct, by the posture controller 170, the inclination of the electrode 11 sucked and conveyed by the suction conveyance belt 132 with respect to the conveyance direction. This configuration enables the electrode 11 supplied by the electrode supplying unit 110 to be placed in a correct posture on the long separator material 41 supplied by the separator supplying unit 120.

The first bonding unit 140 is a mechanism that bonds the pair of long separator materials 41 outside the electrode 11 along the conveyance direction without stopping the conveyance of the electrode 11 and the pair of long separator materials 41 on the conveyance path on which the electrode 11 is conveyed in a manner interposed between the pair of upper and lower long separator materials 41 by the conveying unit 130. To bond the long separator materials 41, the first bonding unit 140 uses the press-lock method described above, for example.

Figure 14B:
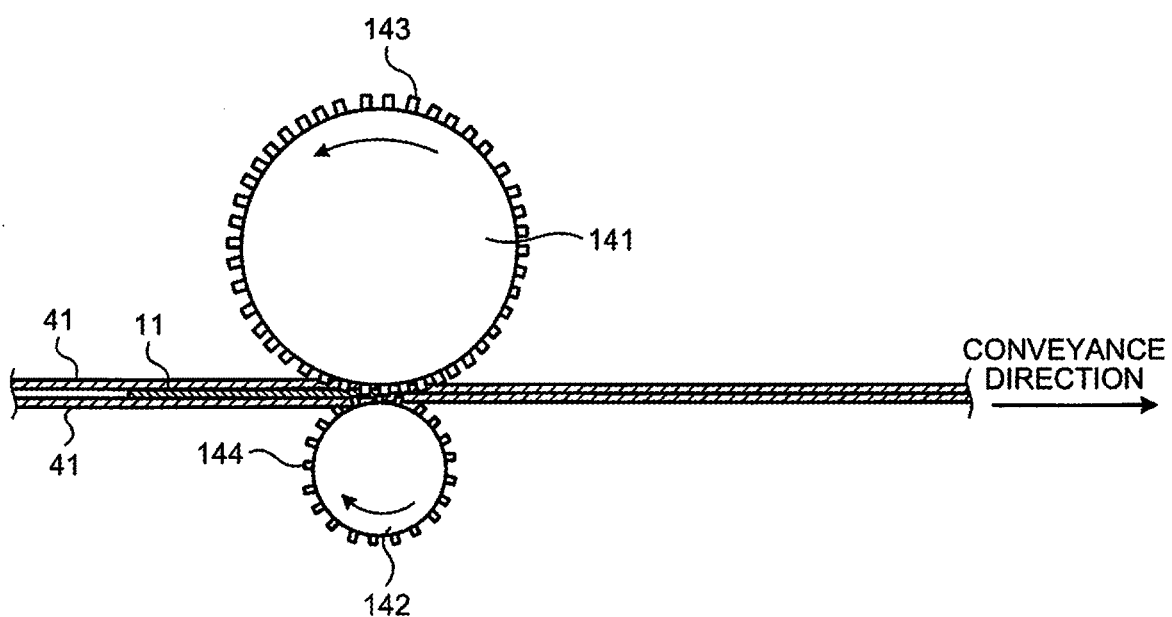
FIG. 14B is a sectional view along line C-C of FIG. 14A.

FIG. 14A is a view for explaining an exemplary configuration of the first bonding unit 140. FIG. 14B is a sectional view along line C-C of FIG. 14A. As illustrated in FIGS. 14A and 14B, for example, the first bonding unit 140 interposes both ends of the pair of long separator materials 41 conveyed with the electrode 11 interposed therebetween between a pair of upper and lower disk-like rotators 141 and 142. The first bonding unit 140 thus bonds the pair of long separator materials 41 outside the electrode 11 along the conveyance direction.

The peripheral surfaces of the pair of upper and lower disk-like rotators 141 and 142 are provided with tooth members 143 and 144, respectively. The tooth members 143 and 144 engage each other by rotation of the rotators 141 and 142. The tooth members 143 and 144 correspond to the pair of tooth members 21 and 22 illustrated in FIG. 4. The rotators 141 and 142 are driven to rotate at circumferential speed corresponding to the conveyance speed of the electrode 11 and the pair of long separator materials 41. Both ends of the pair of long separator materials 41 conveyed with the electrode 11 interposed therebetween are interposed between the tooth members 143 and 144 provided to the peripheral surfaces of the rotators 141 and 142, respectively, and crimped and bonded. As a result, bonding marks 45 extending along the conveyance direction are formed at both ends of the pair of long separator materials 41 conveyed with the electrode 11 interposed therebetween.

The tooth members 143 and 144 that crimp the end of the long separator materials 41 where the tab 11a of the electrode 11 is exposed are provided to the peripheral surfaces of the rotators 141 and 142, respectively, so as to bond the long separator materials 41 in a manner avoiding the tab 11a. As illustrated in FIG. 14A, the rotators 141 and 142 corresponding to one end of the long separator materials 41 and the rotators 141 and 142 corresponding to the other end may be coupled and integrated by a rotating shaft 145. Alternatively, the rotators 141 and 142 corresponding to one end and the rotators 141 and 142 corresponding to the other end may be driven independently or driven coaxially by a gear or the like. The upper rotator 141 and the lower rotator 142 simply need to have a structure that allows the tooth members 143 and 144 to engage each other. The upper rotator 141 and the lower rotator 142 may have different sizes as illustrated in FIG. 14B or have the same size.

The second bonding unit 150 is a mechanism that bonds the pair of long separator materials 41 outside the electrode 11 along the direction intersecting (substantially orthogonal to) the conveyance direction without stopping the conveyance of the electrode 11 and the pair of long separator materials 41 on the conveyance path on which the electrode 11 is conveyed in a manner interposed between the pair of upper and lower long separator materials 41 by the conveying unit 130. Similarly to the first bonding unit 140, the second bonding unit 150 uses the press-lock method described above, for example, to bond the long separator materials 41.

Figure 15B:
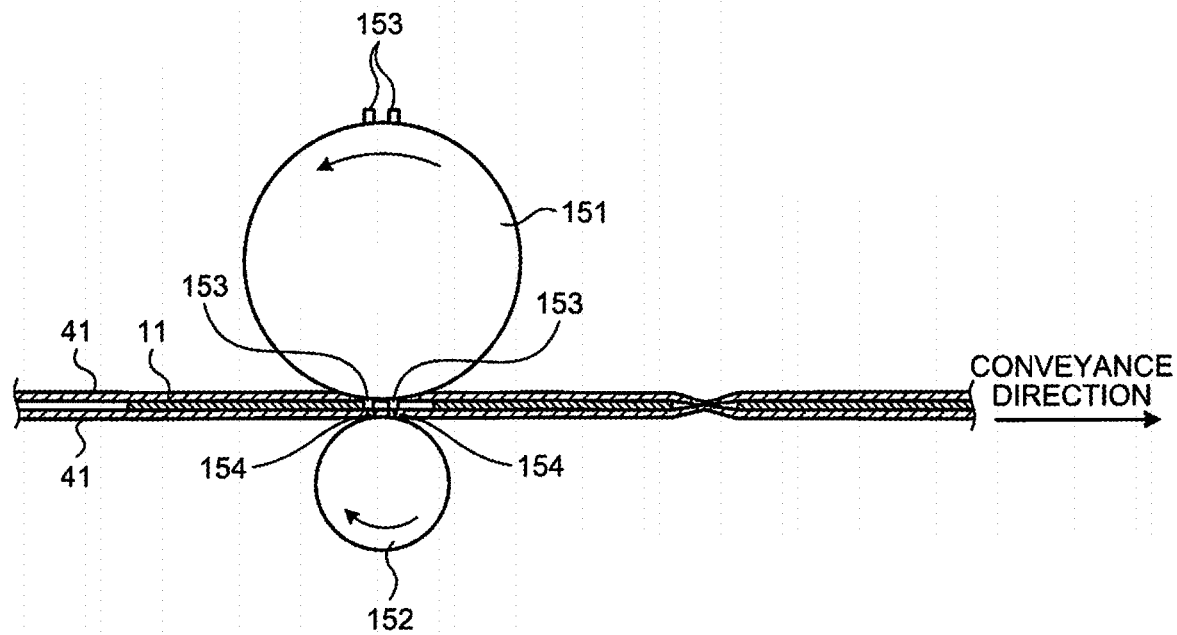
FIG. 15B is a sectional view along line D-D of FIG. 15A.

FIG. 15A is a view for explaining an exemplary configuration of the second bonding unit 150. FIG. 15B is a sectional view along line D-D of FIG. 15A. As illustrated in FIGS. 15A and 15B, for example, the second bonding unit 150 interposes the pair of long separator materials 41 conveyed with the electrode 11 interposed therebetween between a pair of upper and lower drum-like rotators 151 and 152. The second bonding unit 150 thus bonds the pair of long separator materials 41 outside the electrode 11 along the direction intersecting the conveyance direction.

The peripheral surfaces of the pair of upper and lower drum-like rotators 151 and 152 are provided with tooth members 153 and 154, respectively, along the direction intersecting the conveyance direction. The tooth members 153 and 154 engage each other by rotation of the rotators 151 and 152. In the example illustrated in FIGS. 15A and 15B, the pair of long separator materials 41 are bonded along the direction intersecting the conveyance direction at two positions simultaneously between the electrodes 11 disposed side by side. For this purpose, the tooth members 153 and 154 are each provided in two rows along the direction intersecting the conveyance direction. The tooth members 153 and 154 correspond to the pair of tooth members 21 and 22 illustrated in FIG. 4.

The diameters of the rotators 151 and 152 are determined based on the width (pitch) of the electrode 11 conveyed in a manner interposed between the pair of long separator materials 41. In the example illustrated in FIG. 15B, the diameter of the upper rotator 151 is determined such that the circumference of the upper rotator 151 is twice the pitch of the conveyed electrode 11. The diameter of the lower rotator 152 is determined such that the circumference of the lower rotator 152 is equal to the pitch of the conveyed electrode 11.

The rotators 151 and 152 are driven to rotate at circumferential speed corresponding to the conveyance speed of the electrode 11 and the pair of long separator materials 41. At the position between the electrodes 11 disposed side by side, the pair of long separator materials 41 conveyed with the electrode 11 interposed therebetween are interposed between the tooth members 153 and 154 provided to the peripheral surfaces of the rotators 151 and 152, respectively, and crimped and bonded. As a result, bonding marks 46 extending along the direction intersecting the conveyance direction are formed at the position between the electrodes 11 disposed side by side on the conveyed pair of long separator materials 41.

The diameters of the rotators 151 and 152 simply need to be determined such that the circumferences of the rotators 151 and 152 are an integral multiple of the pitch of the conveyed electrode 11 and are not limited to the diameters in the example illustrated in FIG. 15B. While the diameters of the upper rotator 151 and the lower rotator 152 are different in the example illustrated in FIG. 15B, they may be the same diameter.

Figure 16A:
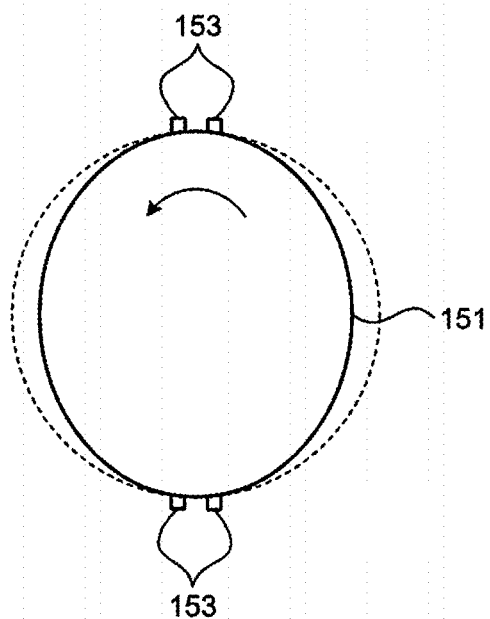
FIG. 16A is a view for explaining another example of a rotator.
Figure 16B:
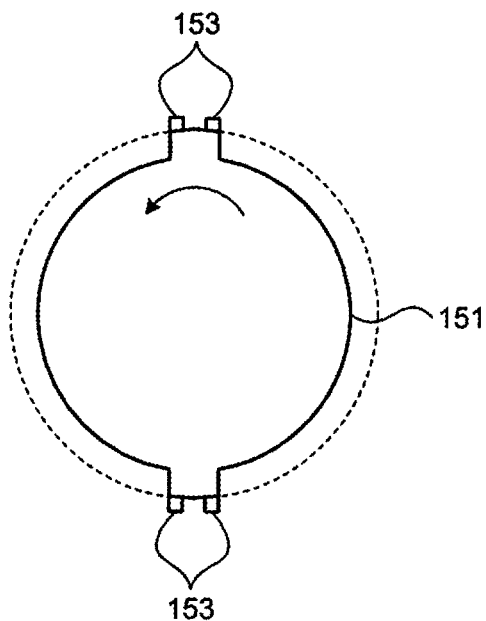
FIG. 16B is a view for explaining still another example of the rotator.
Figure 16C:
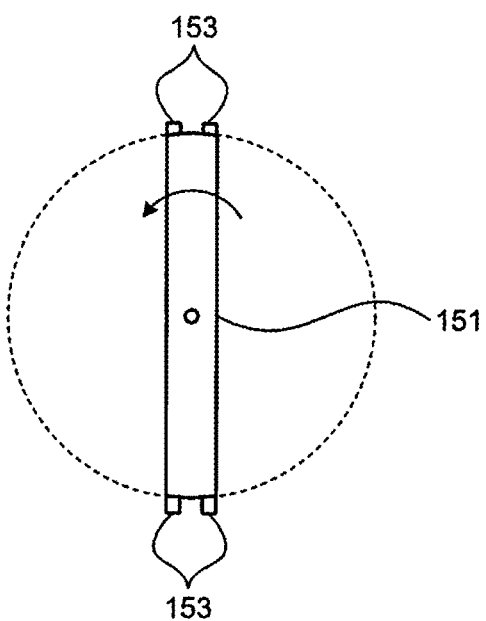
FIG. 16C is a view for explaining still another example of the rotator.

The electrode 11 interposed between the pair of long separator materials 41 passes through the gap between the pair of upper and lower rotators 151 and 152 and is conveyed to the downstream side in the conveyance direction. To prevent excessive pressure from being applied to the electrode 11 at this time, the following structures may be employed. As illustrated in FIG. 16A, for example, the rotator 151 having an elliptical shape can reduce the pressure applied to the electrode 11 when the electrode 11 passes through the gap between the pair of upper and lower rotators 151 and 152. Alternatively, the diameter of the part of the rotator 151 not provided with the tooth members 153 may be made smaller (in other words, the part of the rotator 151 provided with the tooth members 153 may be caused to protrude) as illustrated in FIG. 16B. Still alternatively, the rotator 151 may have a plate shape as illustrated in FIG. 16C.

While the first bonding unit 140 and the second bonding unit 150 are provided separately in the description above, they may be integrated. As illustrated in FIG. 17, for example, the peripheral surface of the rotator 151 is provided with the tooth members 143 that bond the pair of long separator materials 41 along the conveyance direction besides the tooth members 153 that bond the pair of long separator materials 41 along the direction intersecting the conveyance direction. The peripheral surface of the rotator 152 is provided with the tooth members 144, which are not illustrated, that engage the tooth members 143 besides the tooth members 154 that engage the tooth members 153. With this configuration, the bagged electrode manufacturing apparatus 100 can perform the bonding along the conveyance direction and the bonding along the direction intersecting the conveyance direction simultaneously at one position on the conveyance path.

While the first bonding unit 140 and the second bonding unit 150 according to the present embodiment bond the pair of long separator materials 41 by the press-lock method, which is a mechanical crimping method, at least one of the first bonding unit 140 and the second bonding unit 150 may bond the pair of long separator materials 41 using an adhesive. In this case, an adhesive is applied to the portions corresponding to the bonding marks 45 and 46 on one of the long separator materials 41 before the pair of long separator materials 41 are overlapped. Subsequently, the pair of upper and lower rotators 141 and 142 not provided with the tooth members 143 or 144 and the pair of upper and lower rotators 151 and 152 not provided with the tooth members 153 or 154 apply pressure to the portions to which the adhesive is applied in the process of conveying the pair of long separator materials 41 with the electrodes 11 interposed therebetween. As a result, the pair of long separator materials 41 are bonded.

The separators 12 constituting the bagged electrode 10 according to the present embodiment are made of paper. If the separators 12 are made of resin, at least one of the first bonding unit 140 and the second bonding unit 150 may bond the pair of long separator materials 41 by a heat-melting method.

The separating unit 160 is a mechanism that cuts the pair of long separator materials 41 along the direction intersecting the conveyance direction to cut off the bagged electrode 10 without stopping the conveyance of the electrode 11 and the pair of long separator materials 41 on the conveyance path on which the electrode 11 is conveyed in a manner interposed between the pair of upper and lower long separator materials 41 by the conveying unit 130. The separating unit 160 is provided on the most downstream side on the conveyance path of the conveying unit 130.

Figure 18B:
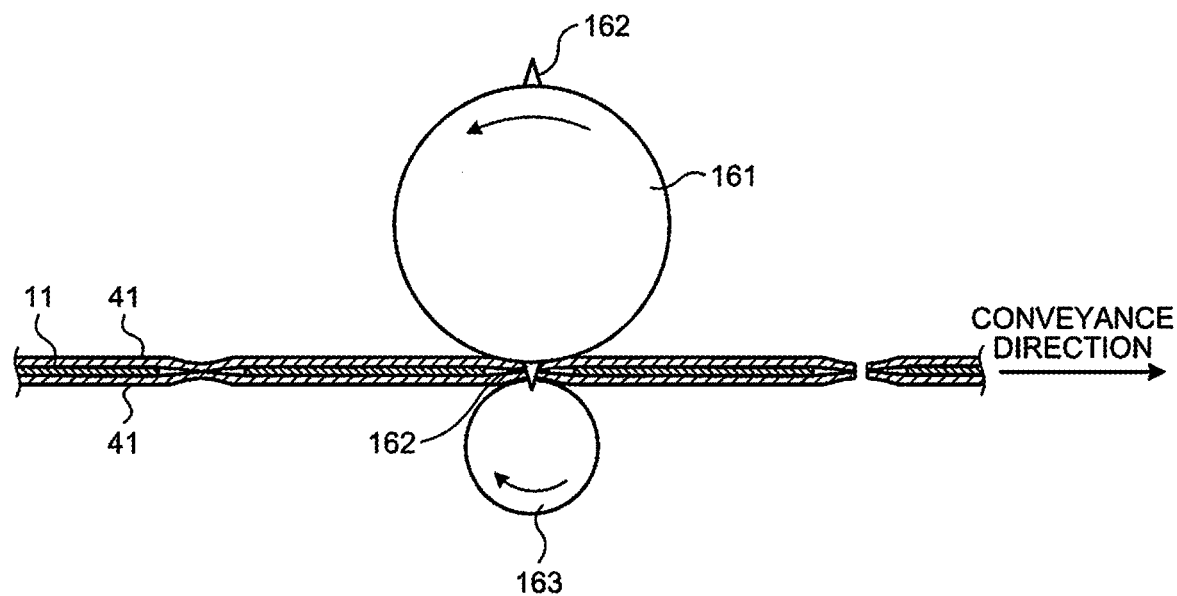
FIG. 18B is a sectional view along line E-E of FIG. 18A.

FIG. 18A is a view for explaining an exemplary configuration of the separating unit 160. FIG. 18B is a sectional view along line E-E of FIG. 18A. As illustrated in FIGS. 18A and 18B, for example, the separating unit 160 cuts the pair of long separator materials 41 using a cutting blade 162 at a position between the two bonding marks 46 formed between the two electrodes 11 to cut off the bagged electrodes 10 while rotating a drum-like rotator 161 provided with the cutting blades 162 on its peripheral surface. The cutting blade 162 is provided to the peripheral surface of the rotator 161 along the direction intersecting the conveyance direction of the pair of long separator materials 41 conveyed with the electrode 11 interposed therebetween. The cutting blade 162 is pressed against the position between the two bonding marks 46, thereby cutting the pair of long separator materials 41 along the direction intersecting the conveyance direction.

A roller 163 is disposed at a position facing the rotator 161 across the pair of long separator materials 41. The roller 163 supports the long separator materials 41 and receives the cutting blade 162 when the pair of long separator materials 41 are cut. Instead of the roller 163, a resin film, such as a self-repairing film, may be used to receive the cutting blade 162 like the example illustrated in FIG. 6.

The diameter of the rotator 161 is determined based on the width (pitch) of the electrode 11 conveyed in a manner interposed between the pair of long separator materials 41. In the example illustrated in FIG. 18B, the diameter of the rotator 161 is determined such that the circumference of the rotator 161 is twice the pitch of the electrode 11. The diameter of the rotator 161 simply needs to be determined such that the circumference of the rotator 161 is an integral multiple of the pitch of the electrode 11 and is not limited to the diameter in the example illustrated in FIG. 18B. The rotator 161 is driven to rotate at circumferential speed corresponding to the conveyance speed of the electrode 11 and the pair of long separator materials 41.

Figure 19A:
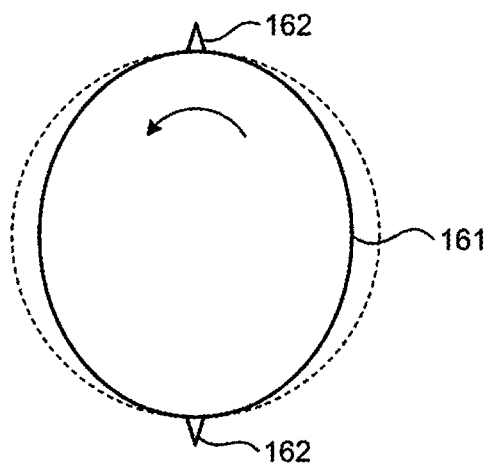
FIG. 19A is a view for explaining another example of a rotator.
Figure 19B:
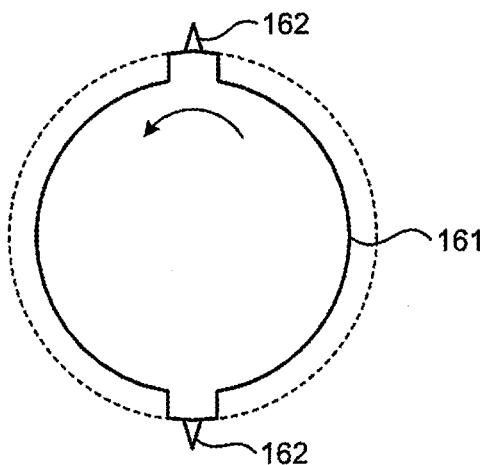
FIG. 19B is a view for explaining still another example of the rotator.
Figure 19C:
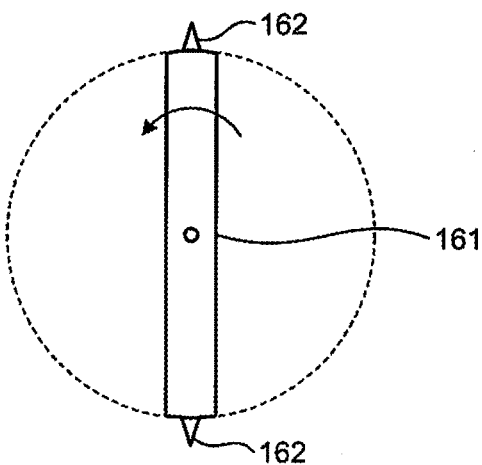
FIG. 19C is a view for explaining still another example of the rotator.

In the same manner as the rotator 151 of the second bonding unit 150, the rotator 161 may have a shape that prevents excessive pressure from being applied to the conveyed electrode 11. As illustrated in FIG. 19A, for example, the rotator 161 having an elliptical shape can reduce the pressure applied to the electrodes 11 when the electrode 11 passes through the gap between the rotator 161 and the roller 163. Alternatively, the diameter of the part of the rotator 161 not provided with the cutting blade 162 may be made smaller (in other words, the part of the rotator 161 provided with the cutting blade 162 may be caused to protrude) as illustrated in FIG. 19B. Still alternatively, the rotator 161 may have a plate shape as illustrated in FIG. 19C.

The following describes a specific example of the mechanism of the conveying unit 130 near the separating unit 160. In the following example, the suction conveyance belts 132 are each wound around a plurality of lower conveyance rollers 131 at predetermined positions. In addition, the suction conveyance belts 132 are each wound around a plurality of upper conveyance rollers 133 at predetermined positions. The electrode 11 and the long separator materials 41 are conveyed in a manner interposed between the upper and lower suction conveyance belts 132.

Figure 20B:
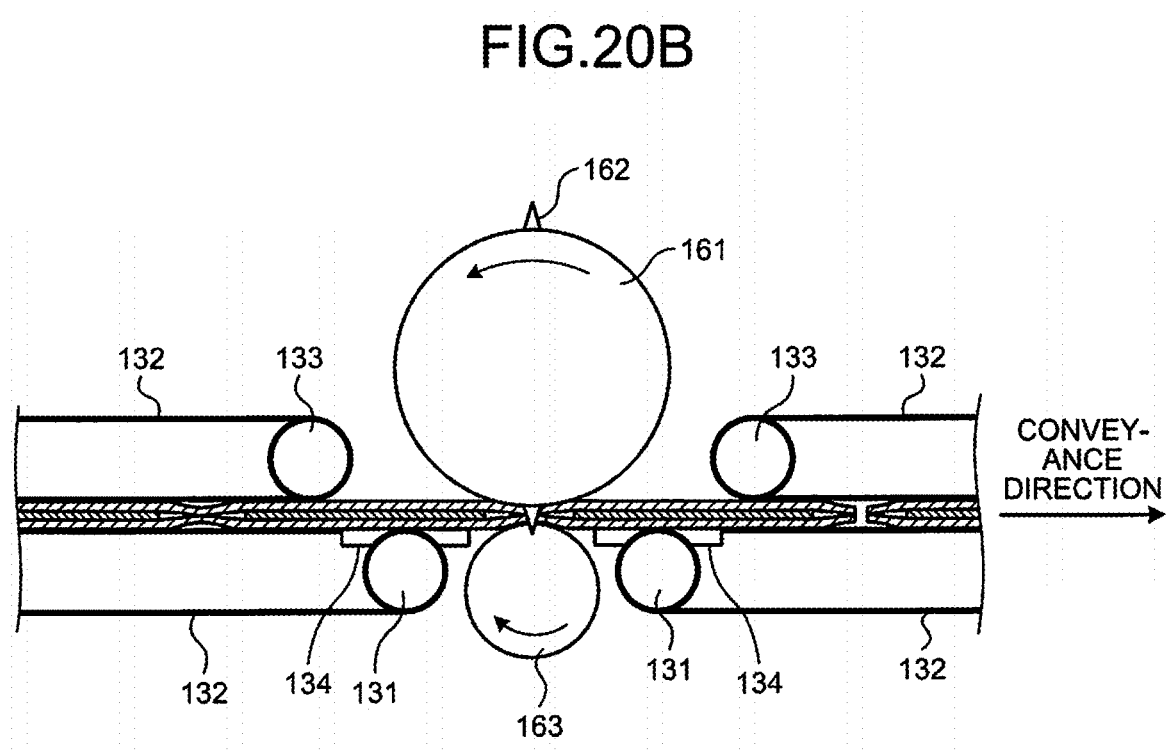
FIG. 20B is a sectional view along line F-F of FIG. 20A.

FIG. 20A is a view for explaining an example of the mechanism of the conveying unit 130 near the separating unit 160. FIG. 20B is a sectional view along line F-F of FIG. 20A. FIG. 20A does not illustrate the rotator 161 provided with the cutting blades 162 of the separating unit 160 for the convenience of illustrating a cutting position 47 for cutting the pair of long separator materials 41 conveyed with the electrode 11 interposed therebetween.

In the configuration that conveys the electrode 11 and the long separator materials 41 in a manner interposed between the upper and lower suction conveyance belts 132, the suction conveyance belts 132 need to be divided between the upstream side and the downstream side of the separating unit 160 in the conveyance direction as illustrated in FIGS. 20A and 20B. Let us assume a case where an inter-roller distance Lr between the upper conveyance roller 133 just before the rotator 161 of the separating unit 160 and the upper conveyance roller 133 just after the rotator 161 is equal to or smaller than the pitch of the electrode 11 (in other words, the size of the bagged electrode 10 in the conveyance direction) conveyed in a manner interposed between the pair of long separator materials 41. In this case, the bagged electrode 10 cut off by cutting the pair of long separator materials 41 by the separating unit 160 can be transferred from the suction conveyance belts 132 on the upstream side of the separating unit 160 to the suction conveyance belts 132 on the downstream side. If the upper conveyance rollers 133 overlap the lower conveyance rollers 131 (in other words, the lower part of the upper conveyance rollers 133 is disposed slightly below the upper part of the lower conveyance rollers 131), typical conveyance belts may be used instead of the upper and lower suction conveyance belts 132.

Consequently, with the configuration illustrated in FIGS. 20A and 20B, the cutting blade 162 provided to the peripheral surface of the rotator 161 can cut the cutting position 47 of the pair of long separator materials 41 at once over the whole length in the direction intersecting the conveyance direction. In the configuration illustrated in FIGS. 20A and 20B, guide members 134 are preferably disposed near the upper conveyance roller 133 just before the rotator 161 and near the upper conveyance roller 133 just after the rotator 161 to appropriately transfer the bagged electrode 10 cut off by the separating unit 160.

Figure 21B:
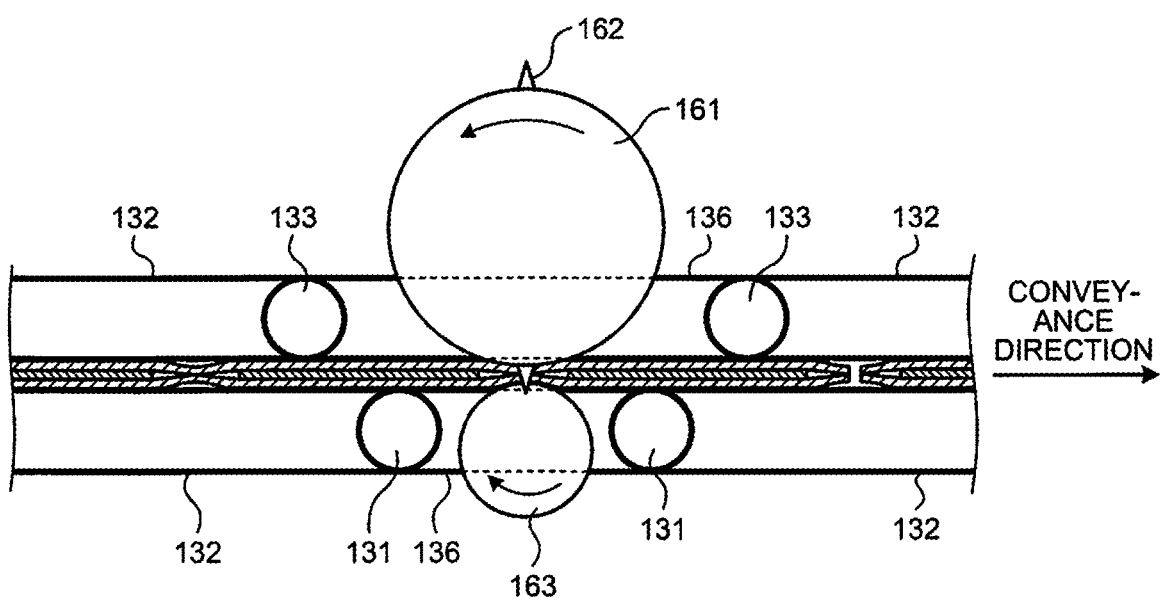
FIG. 21B is a sectional view along line G-G of FIG. 21A.

FIG. 21A is a view for explaining another example of the mechanism of the conveying unit 130 near the separating unit 160. FIG. 21B is a sectional view along line G-G of FIG. 21A. If the inter-roller distance Lr is larger than the pitch of the electrode 11 conveyed in a manner interposed between the pair of long separator materials 41, the bagged electrode 10 cut off by the separating unit 160 fails to be transferred from the suction conveyance belts 132 on the upstream side of the separating unit 160 to the suction conveyance belts 132 on the downstream side. In this case, as illustrated in FIGS. 21A and 21B, suction conveyance belts 136 that hold the ends of the pair of long separator materials 41 in the direction intersecting the conveyance direction are provided between the suction conveyance belts 132 on the upstream side of the separating unit 160 and the suction conveyance belts 132 on the downstream side.

In the configuration illustrated in FIGS. 21A and 21B, the rotator 161 of the separating unit 160 needs to be disposed so as not to interfere with the suction conveyance belts 136 that hold the ends of the pair of long separator materials 41 in the direction intersecting the conveyance direction. As a result, both ends of the cutting position 47 of the pair of long separator materials 41 in the direction intersecting the conveyance direction fail to be cut by the cutting blade 162 provided to the peripheral surface of the rotator 161. Consequently, the configuration illustrated in FIGS. 21A and 21B includes a notch forming unit on the upstream side of the separating unit 160 in the conveyance direction. The notch forming unit forms notches 48 in advance at both ends of the cutting position 47 of the pair of long separator materials 41 in the direction intersecting the conveyance direction. If the upper conveyance rollers 133 overlap the lower conveyance rollers 131, typical conveyance belts may be used instead of the upper and lower suction conveyance belts 132 in the same manner described in the configuration illustrated in FIGS. 20A and 20B.

The notch forming unit may be integrated with the first bonding unit 140 and/or the second bonding unit 150. As illustrated in FIG. 22, for example, blades corresponding to the respective notches 48 may be provided to the peripheral surface of the rotator 141 provided with the tooth members 143 of the first bonding unit 140 and serve as a notch forming unit 180. Alternatively, as illustrated in FIG. 23, for example, blades corresponding to the respective notches 48 may be provided to the peripheral surface of the rotator 151 provided with the tooth members 153 of the second bonding unit 150 and serve as the notch forming unit 180. If the first bonding unit 140 and the second bonding unit 150 are integrated as illustrated in FIG. 17, blades corresponding to the respective notches 48 may be provided to the peripheral surface of the rotator 151 provided with the tooth members 143 of the first bonding unit 140 and the tooth members 153 of the second bonding unit 150 and serve as the notch forming unit 180.

While the separating unit 160 is provided separately from the first bonding unit 140 and the second bonding unit 150 in the description above, it may be integrated with the first bonding unit 140 and the second bonding unit 150. As illustrated in FIG. 24, for example, by providing the cutting blade 162 that cuts the pair of long separator materials 41 along the direction intersecting the conveyance direction to the peripheral surface of the rotator 151 provided with the tooth members 153 of the second bonding unit 150, the second bonding unit 150 and the separating unit 160 can be integrated. Alternatively, as illustrated in FIG. 25, for example, by providing the cutting blade 162 that cuts the pair of long separator materials 41 along the direction intersecting the conveyance direction to the peripheral surface of the rotator 151 provided with the tooth members 143 of the first bonding unit 140 and the tooth members 153 of the second bonding unit 150, the first bonding unit 140, the second bonding unit 150, and the separating unit 160 may be integrated.

The separating unit 160 according to the present embodiment cuts the pair of long separator materials 41 conveyed with the electrode 11 interposed therebetween along the direction intersecting the conveyance direction by pressing the cutting blade 162 provided to the peripheral surface of the drum-like rotator 161 (rotator 151 when the separating unit 160 is integrated with the second bonding unit 150) against the pair of long separator materials 41. The method for cutting the long separator materials 41 by the separating unit 160 is not limited to the example described above. The separating unit 160, for example, may cut the pair of long separator materials 41 conveyed with the electrode 11 interposed therebetween along the direction intersecting the conveyance direction by irradiating the pair of long separator materials 41 with laser beam.

Alternatively, the separating unit 160 may cut the pair of long separator materials 41 conveyed with the electrode 11 interposed therebetween along the direction intersecting the conveyance direction by pressing a circular cutter against the pair of long separator materials 41 while moving the circular cutter in the direction intersecting the conveyance direction.

Figure 26A:
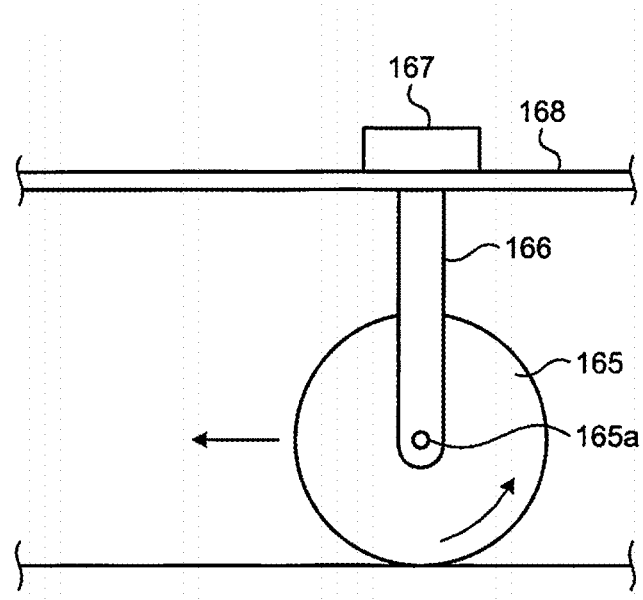
FIG. 26A is a view for explaining another example of the separating unit.

As illustrated in FIG. 26A, for example, a slider 167 is attached to a guide rail 168 disposed along the movement path of a circular cutter 165. A handle 166 that supports the circular cutter 165 rotatably about a rotating shaft 165a is fixed to the slider 167. When the slider 167 moves along the guide rail 168, the circular cutter 165 is pressed against the pair of long separator materials 41 conveyed with the electrode 11 interposed therebetween while being rotated. As a result, the separating unit 160 can cut the pair of long separator materials 41 along the direction intersecting the conveyance direction.

Figure 26B:
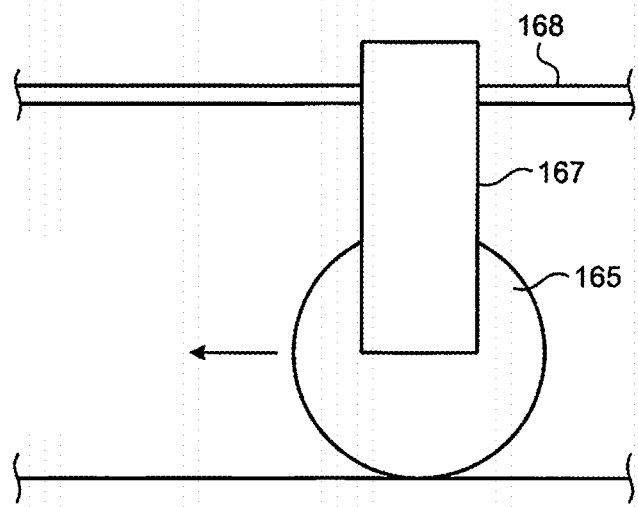
FIG. 26B is a view for explaining still another example of the separating unit.

Alternatively, as illustrated in FIG. 26B, for example, the circular cutter 165 may be fixed and attached to the slider 167. When the slider 167 moves along the guide rail 168, the circular cutter 165 is pressed against the pair of long separator materials 41 conveyed with the electrode 11 interposed therebetween without being rotated. As a result, the separating unit 160 cuts the pair of long separator materials 41 along the direction intersecting the conveyance direction. In this configuration, the circular cutter 165 is fixed to the slider 167 such that it becomes rotatable when a certain magnitude of force is applied thereto. By regularly changing the position of the blade of the circular cutter 165 pressed against the pair of long separator materials 41, the durability of the circular cutter 165 can be increased.

Figure 27:
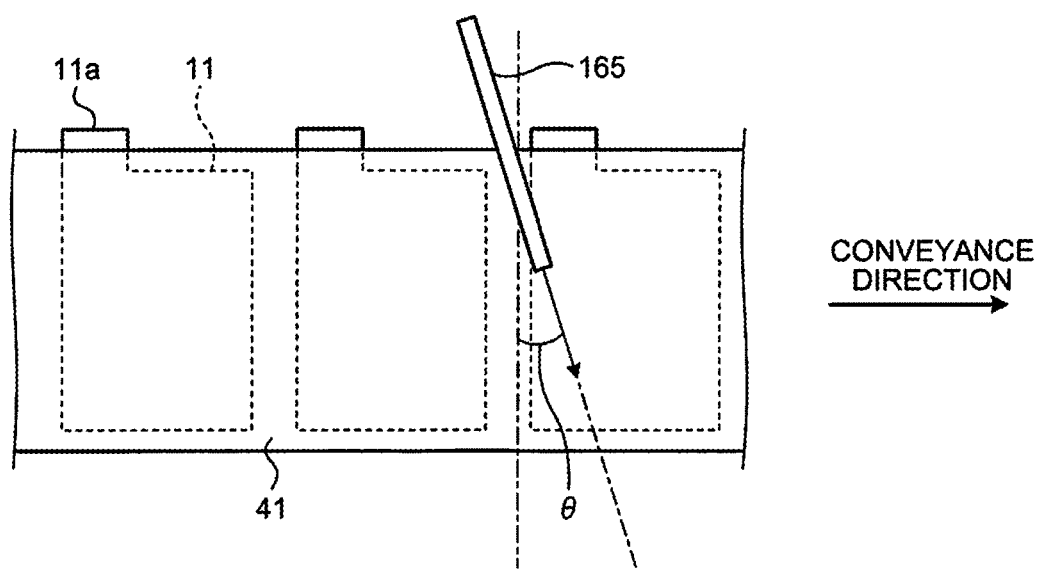
FIG. 27 is a view for explaining a movement direction of a circular cutter.

The configuration that cuts the pair of long separator materials 41 while moving the circular cutter 165 as described above can cut the pair of long separator materials 41 along a direction substantially orthogonal to the conveyance direction by making the movement direction of the circular cutter 165 oblique with respect to the direction orthogonal to the conveyance direction, as illustrated in FIG. 27. When Vd is the conveyance speed of the pair of long separator materials 41 conveyed with the electrode 11 interposed therebetween, Vc is the movement speed of the circular cutter 165, and θ is the angle between the direction orthogonal to the conveyance direction and the movement direction of the circular cutter 165, the separating unit 160 can cut the pair of long separator materials 41 along a direction substantially orthogonal to the conveyance direction by moving the circular cutter 165 in a movement direction satisfying Vd=sin θ×Vc.

In this configuration, however, the circular cutter 165 needs to be returned to the original position every time one cutting is finished. For this purpose, the handle 166 that supports the circular cutter 165 and the slider 167, for example, may be made extendable. By reciprocating the circular cutter 165 while preventing it from coming into contact with the long separator materials 41 when returning to the original position, the separating unit 160 can perform cutting by the circular cutter 165 appropriately.

In the description above, the size of the long separator materials 41 in the direction intersecting the conveyance direction is equal to that of the separators 12 constituting the bagged electrode 10. If the size of the long separator materials 41 in the direction intersecting the conveyance direction is larger than that of the separators 12, margins of the long separator materials 41 need to be cut off. In this case, a margin separating unit is provided at any position on the conveyance path. The margin separating unit is a mechanism that cuts both ends in the direction intersecting the conveyance direction of the pair of long separator materials 41 along the conveyance direction to cut off the margins of the pair of long separator materials 41 without stopping the conveyance of the electrode 11 and the pair of long separator materials 41.

Figure 28:
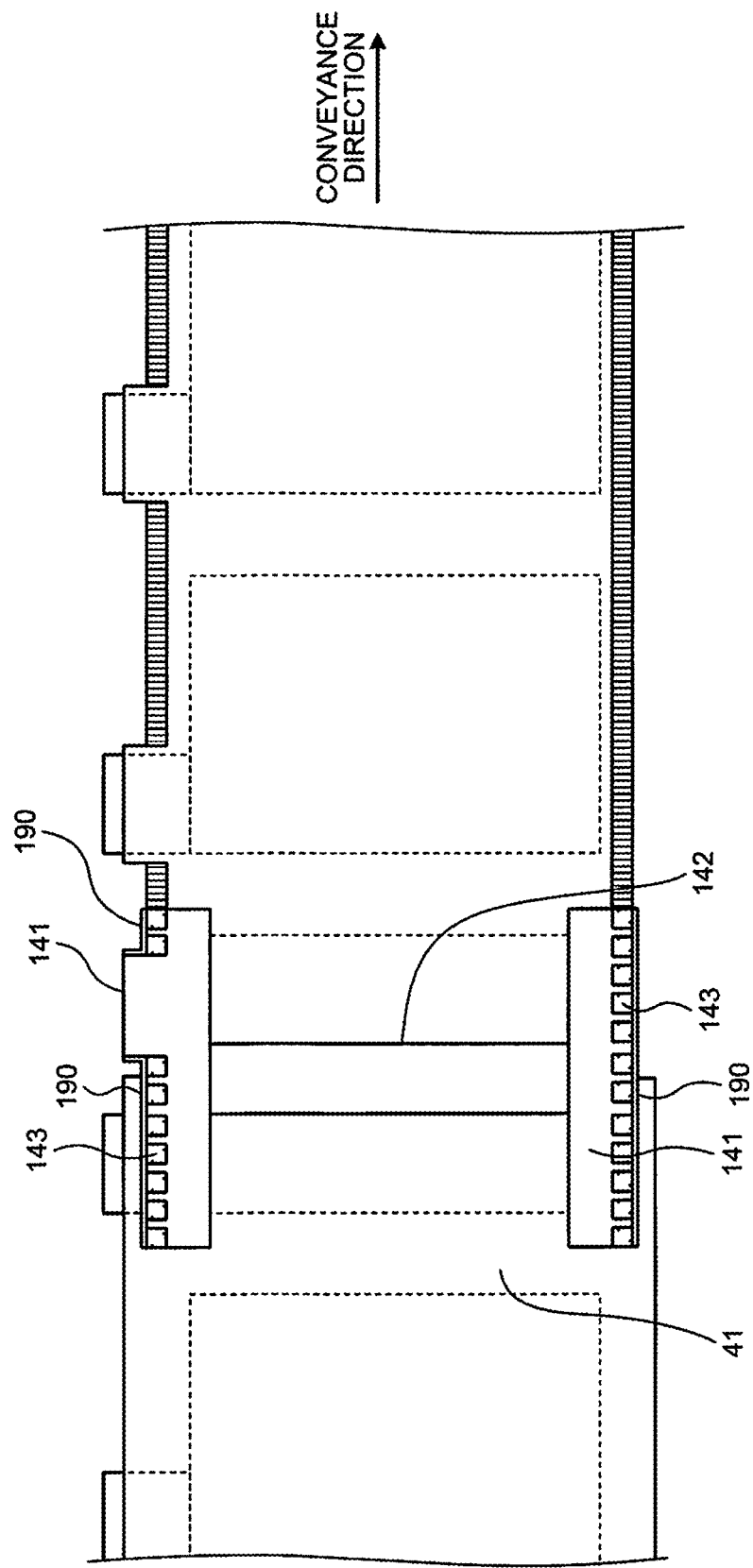
FIG. 28 is a view for explaining an example where a margin separating unit is integrated with the first bonding unit.

FIG. 28 illustrates an example of the margin separating unit. In the example illustrated in FIG. 28, a margin separating unit 190 is integrated with the first bonding unit 140. In other words, the peripheral surface of the rotator 141 provided with the tooth members 143 of the first bonding unit 140 is further provided with a blade serving as the margin separating unit 190. The margin separating unit 190 having this structure cuts both ends in the direction intersecting the conveyance direction of the pair of long separator materials 41 along the conveyance direction to cut off the margins of the pair of long separator materials 41 by rotation of the rotator 141 with the conveyance of the electrode 11 and the pair of long separator materials 41. As illustrated in FIG. 28, the blade corresponding to the end where the tab 11a of the electrode 11 is exposed out of both ends of the pair of long separator materials 41 in the direction intersecting the conveyance direction has a shape that cuts the end in a manner avoiding the portion where the tab 11a is exposed.

The margin separating unit 190 simply needs to be provided at any position on the conveyance path on which the electrode 11 and the pair of long separator materials 41 are conveyed and may be provided independently of the first bonding unit 140. Alternatively, the margin separating unit 190 may be integrated with the second bonding unit 150 and/or the separating unit 160.

As described in the specific examples above in greater detail, the bagged electrode manufacturing apparatus 100 according to the present embodiment includes the conveying unit 130, the first bonding unit 140, the second bonding unit 150, and the separating unit 160. The conveying unit 130 conveys the electrode 11 in a manner interposed between the pair of long separator materials 41 unwound from the pair of separator rolls 40. The first bonding unit 140 bonds the pair of long separator materials 41 outside the electrode 11 along the conveyance direction without stopping the conveyance of the electrode 11 and the pair of long separator materials 41. The second bonding unit 150 bonds the pair of long separator materials 41 outside the electrode 11 along the direction intersecting the conveyance direction without stopping the conveyance of the electrode 11 and the pair of long separator materials 41. The separating unit 160 cuts the pair of long separator materials 41 along the direction intersecting the conveyance direction to cut off the bagged electrode 10 without stopping the conveyance of the electrode 11 and the pair of long separator materials 41.

The bagged electrode manufacturing apparatus 100 having the configuration described above can perform the steps required to manufacture the bagged electrode 10 in the process of conveying the long separator materials 41 yet to be cut into the separators 12 with a sheet shape constituting the bagged electrode 10 with the electrode 11 interposed therebetween without stopping the conveyance. Consequently, the bagged electrode manufacturing apparatus 100 can manufacture the bagged electrode 10 at higher speed and improve the productivity in manufacturing a laminated battery including the bagged electrode 10. Furthermore, the bagged electrode manufacturing apparatus 100 according to the present embodiment can be applied to manufacturing a larger battery because it has no step particularly affected by an increased size of the electrode 11.

Figure 29:
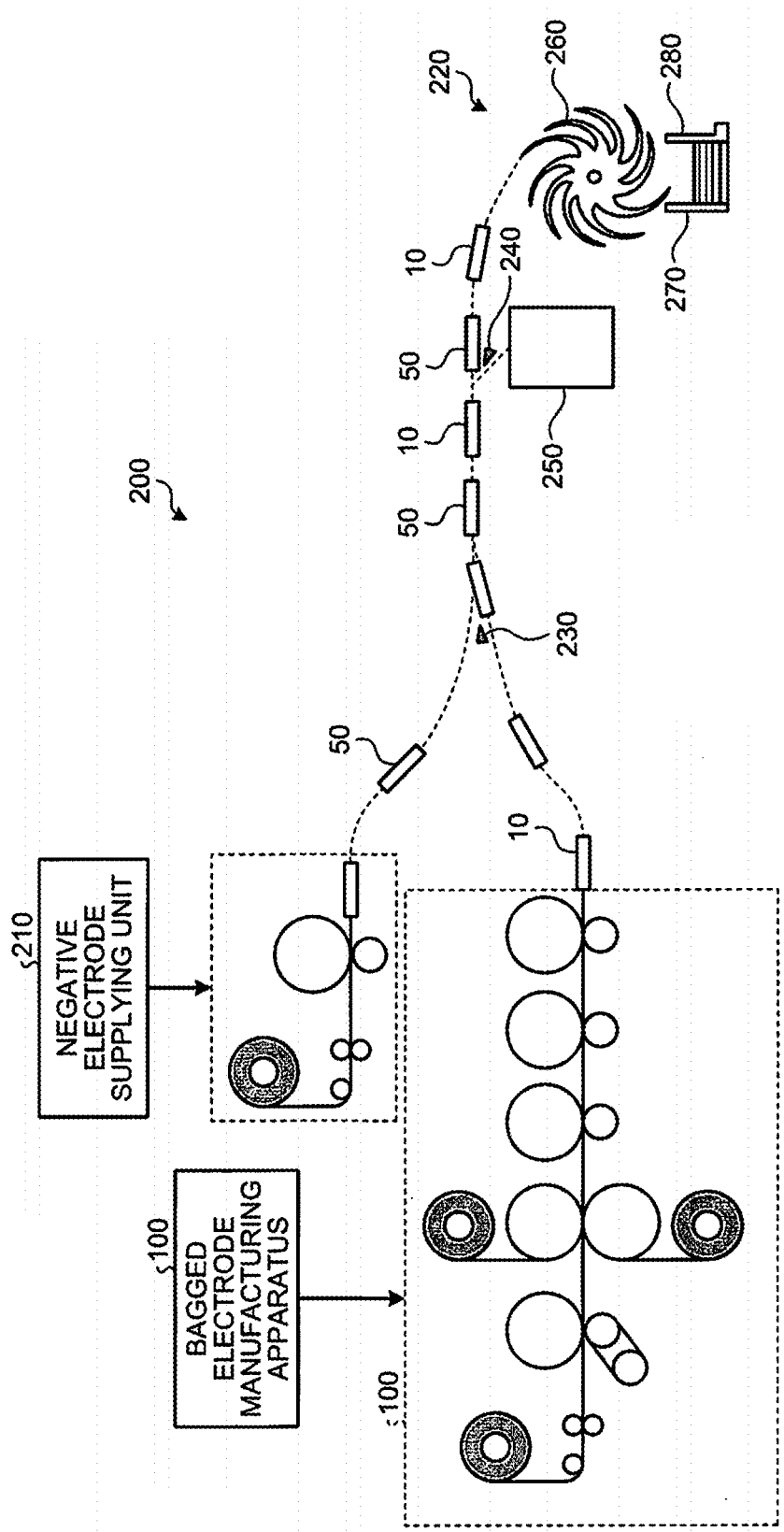
FIG. 29 is a view schematically illustrating the entire configuration of an accumulating apparatus.

The bagged electrode manufacturing apparatus 100 described above may be provided as part of an accumulating apparatus that manufactures a laminated battery. FIG. 29 is a view schematically illustrating the entire configuration of an accumulating apparatus 200. As illustrated in FIG. 29, the accumulating apparatus 200 conveys the bagged electrodes 10 manufactured by the bagged electrode manufacturing apparatus 100 (in this example, the electrodes 11 constituting the bagged electrodes 10 are positive electrodes) and negative electrodes 50 cut into a sheet shape and supplied from a negative electrode supplying unit 210 alternately to the downstream side. The accumulating apparatus 200 then layers the bagged electrodes 10 and the negative electrodes 50 alternately in a layering unit 220 on the downstream side.

The bagged electrodes 10 manufactured by the bagged electrode manufacturing apparatus 100 (bagged electrodes 10 separated by the separating unit 160 of the bagged electrode manufacturing apparatus 100) and the negative electrodes 50 supplied from the negative electrode supplying unit 210 are conveyed alternately to the downstream side at a merging part (near a guide 230). The configuration of the negative electrode supplying unit 210 is the same as the electrode supplying unit 110 of the bagged electrode manufacturing apparatus 100.

The conveyance path for the bagged electrodes 10 and the negative electrodes 50 is provided with a detecting mechanism (not illustrated) that detects a defect in the bagged electrodes 10 and the negative electrodes 50. If the detecting mechanism detects a defect in the bagged electrode 10 or the negative electrode 50, the bagged electrode 10 or the negative electrode 50 in which the defect is detected is guided to and collected in a reject container 250 by controlling the operation of a path switching claw 240. If a defect is detected in the bagged electrode 10, the bagged electrode 10 and the negative electrode 50 following the bagged electrode 10 are collected simultaneously in the reject container 250. If a defect is detected in the negative electrode 50, the negative electrode 50 and the bagged electrode 10 following the negative electrode 50 are collected simultaneously in the reject container 250. With this mechanism, the accumulating apparatus 200 can prevent the bagged electrodes 10 or the negative electrodes 50 successively to the downstream side.

The layering unit 220 layers the bagged electrodes 10 and the negative electrodes 50 alternately using an impeller 260, for example. The impeller 260 includes a number of blade members and rotates such that the bagged electrodes 10 and the negative electrodes 50 conveyed alternately are each interposed between the blade members disposed side by side. A scraping plate 270 and a wall guide 280 are provided under the impeller 260. When the blade members of the impeller 260 come over the scraping plate 270, the bagged electrodes 10 and the negative electrodes 50 abut on the scraping plate 270 and fall below. The bagged electrodes 10 and the negative electrodes 50 are prevented from being misaligned by the wall guide 280 and are layered alternately.

The accumulating apparatus 200 having the configuration described above can perform the step of layering the bagged electrodes 10 and the negative electrodes 50 alternately in the process of manufacturing a laminated battery at significantly higher speed and improve the productivity in manufacturing the laminated battery.

If the size of the bagged electrode 10 manufactured by the bagged electrode manufacturing apparatus 100 is different from that of the negative electrode 50 supplied from the negative electrode supplying unit 210, it may possibly be difficult for the accumulating apparatus 200 having the configuration described above to layer the bagged electrodes 10 and the negative electrodes 50 without any misalignment. To address this, the present embodiment makes the size of the bagged electrode 10 cut off by the separating unit 160 of the bagged electrode manufacturing apparatus 100 equal to that of the negative electrode 50 supplied from the negative electrode supplying unit 210.

Specifically, as illustrated in FIG. 30, $L1<L2\approx L3$ and $W1<W2\approx W3$ are satisfied where $L1$ is the length of the long side of the electrode (positive electrode) 11 in the bagged electrode 10, $W1$ is the length of the short side of the electrode 11, $L2$ is the length of the long side of the bagged electrode 10, $W2$ is the length of the short side of the bagged electrode 10, $L3$ is the length of the long side of the negative electrode 50, and $W3$ is the length of the short side of the negative electrode 50. In other words, the length $W2$ of the short side of the bagged electrode is substantially equal to the length $W3$ of the short side of the negative electrode. The length $L2$ of the long side of the bagged electrode is substantially equal to the length $L3$ of the long side of the negative electrode. Consequently, the layering unit 220 of the accumulating apparatus 200 can layer the bagged electrodes 10 manufactured by the bagged electrode manufacturing apparatus 100 and the negative electrodes 50 supplied from the negative electrode supplying unit 210 without any misalignment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An apparatus for manufacturing a bagged electrode with a first electrode of a battery interposed between a pair of separators, the apparatus comprising:
   a conveying unit configured to convey the first electrode in a manner interposed between a pair of long separator materials unwound from a pair of rolls;
   a first bonding unit configured to bond the pair of long separator materials outside the first electrode along a conveyance direction without stopping conveyance of the first electrode and the pair of long separator materials;
   a second bonding unit configured to bond the pair of long separator materials outside the first electrode along a direction intersecting the conveyance direction without stopping conveyance of the first electrode and the pair of long separator materials; and
   a separating unit configured to cut the pair of long separator materials along the direction intersecting the conveyance direction to cut off the bagged electrode without stopping conveyance of the first electrode and the pair of long separator materials, wherein the second bonding unit includes a pair of rotators including thereon a pair of tooth members that engage each other and configured to rotate with conveyance of the first electrode and the pair of long separator materials, the pair of rotators interposing and crimping the pair of long separator materials therebetween to bond the pair of separator materials, each of the pair of tooth members of the second bonding unit is provided in two rows of teeth in the direction intersecting the conveyance direction, and the pair of tooth members are provided on respective peripheral surfaces of the pair of rotators, and a cutting blade is arranged between the two rows of teeth on one of the rotators of the second bonding unit.

2. The apparatus for manufacturing the bagged electrode according to claim 1, wherein the second bonding unit is integrated with the separating unit.

3. The apparatus for manufacturing the bagged electrode according to claim 1, wherein the first bonding unit and the second bonding unit are integrated.

4. The apparatus for manufacturing the bagged electrode according to claim 1, wherein the separating unit cuts the pair of long separator materials along the direction intersecting the conveyance direction by pressing the cutting blade provided on a peripheral surface of one of the pair of rotators configured to rotate with conveyance of the first electrode and the pair of long separator materials against the pair of long separator materials.

5. The apparatus for manufacturing the bagged electrode according to claim 1, wherein the separating unit cuts the pair of long separator materials along the direction intersecting the conveyance direction by irradiating the pair of long separator materials with laser beam.

6. The apparatus for manufacturing the bagged electrode according to claim 1, further comprising a notch forming unit provided on an upstream side of the separating unit in the conveyance direction and including blades at both ends of the peripheral surface of the first bonding unit or the second bonding unit in the direction intersecting the conveyance direction to form notches at both ends of the pair of long separator materials in the direction intersecting the conveyance direction without stopping conveyance of the first electrode and the pair of long separator materials.

7. The apparatus for manufacturing the bagged electrode according to claim 6, wherein the notch forming unit is integrated with at least one of the first bonding unit and the second bonding unit.

8. The apparatus for manufacturing the bagged electrode according to claim 1, further comprising a margin separating unit configured to cut both ends in the direction intersecting the conveyance direction of the pair of long separator materials along the conveyance direction to cut off a margin of the pair of long separator materials without stopping conveyance of the first electrode and the pair of long separator materials.

9. The apparatus for manufacturing the bagged electrode according to claim 8, wherein the margin separating unit is integrated with at least one of the first bonding unit, the second bonding unit, and the separating unit.

10. An accumulating apparatus comprising:

the apparatus for manufacturing the bagged electrode according to claim 1; and a layering unit configured to layer the bagged electrode cut off by the separating unit of the apparatus for manufacturing the bagged electrode and a second electrode of the battery alternately.

11. The accumulating apparatus according to claim 10, wherein the size of the bagged electrode cut off by the separating unit is equal to the size of the second electrode.

12. A method for manufacturing a bagged electrode with a first electrode of a battery interposed between a pair of separators, the method comprising:

conveying the first electrode in a manner interposed between a pair of long separator materials unwound from a pair of rolls;

bonding the pair of long separator materials outside the first electrode along a conveyance direction and a direction intersecting the conveyance direction without stopping conveyance of the first electrode and the pair of long separator materials; and cutting the pair of long separator materials along the direction intersecting the conveyance direction to cut off the bagged electrode without stopping conveyance of the first electrode and the pair of long separator materials, wherein the bonding the pair of long separator materials outside the first electrode includes:

interposing and crimping the pair of long separator materials between a pair of tooth members that engage each other, each of the pair of tooth members being provided in two rows of teeth in the direction intersecting the conveyance direction, and the pair of tooth members are provided on respective peripheral surfaces of a pair of rotators configured to rotate with conveyance of the first electrode and the pair of long separator materials.

13. The apparatus for manufacturing the bagged electrode according to claim 1, wherein each of the first and second bonding units interposes and crimps the pair of long separator materials between a pair of tooth members that engage each other, to bond the pair of separator materials, and the pair of tooth members are integrally provided on peripheral surfaces of a pair of rotators configured to rotate with conveyance of the first electrode and the pair of long separator materials.

14. The apparatus for manufacturing the bagged electrode according to claim 4, wherein at least one of the first bonding unit and the second bonding unit is integrated with the separating unit.

* * * * *